US008735766B2

(12) United States Patent
Suslov

(10) Patent No.: US 8,735,766 B2
(45) Date of Patent: May 27, 2014

(54) CATHODE ASSEMBLY AND METHOD FOR PULSED PLASMA GENERATION

(75) Inventor: Nikolay Suslov, Vastra Frolonda (SE)

(73) Assignee: Plasma Surgical Investments Limited, Virgin Islands (VG)

( * ) Notice: Subject to any disclaimer, the term of this patent is extended or adjusted under 35 U.S.C. 154(b) by 174 days.

(21) Appl. No.: 11/890,937

(22) Filed: Aug. 6, 2007

(65) Prior Publication Data

US 2009/0039789 A1 Feb. 12, 2009

(51) Int. Cl.
*B23K 10/00* (2006.01)
*H05B 31/26* (2006.01)

(52) U.S. Cl.
USPC .............. 219/121.51; 219/121.47; 219/76.16; 315/111.21; 315/111.01

(58) Field of Classification Search
USPC ............... 219/121.47, 121.48, 121.5, 121.52, 219/76.16, 121.51, 121.38; 315/111.21
See application file for complete search history.

(56) References Cited

U.S. PATENT DOCUMENTS

| | | | | |
|---|---|---|---|---|
| 3,077,108 | A | | 2/1963 | Gage et al. |
| 3,082,314 | A | | 3/1963 | Yoshiaki et al. |
| 3,100,489 | A | | 8/1963 | Bagley |
| 3,145,287 | A | | 8/1964 | Seibein et al. |
| 3,153,133 | A | * | 10/1964 | Ducati ..................... 219/121.44 |
| 3,270,745 | A | | 9/1966 | Wood |
| 3,360,988 | A | | 1/1968 | Stein et al. |
| 3,413,509 | A | | 11/1968 | Cann et al. |
| 3,433,991 | A | | 3/1969 | Whyman |
| 3,434,476 | A | | 3/1969 | Shaw et al. |
| 3,534,388 | A | | 10/1970 | Akiyama et al. |
| 3,628,079 | A | | 12/1971 | Dobbs et al. |
| 3,676,638 | A | | 7/1972 | Stand |
| 3,775,825 | A | | 12/1973 | Wood et al. |
| 3,803,380 | A | | 4/1974 | Ragaller |
| 3,838,242 | A | | 9/1974 | Goucher |
| 3,851,140 | A | | 11/1974 | Coucher |
| 3,866,089 | A | | 2/1975 | Hengartner |

(Continued)

FOREIGN PATENT DOCUMENTS

| | | |
|---|---|---|
| AU | 2000250426 | 6/2005 |
| AU | 2006252145 | 1/2007 |

(Continued)

OTHER PUBLICATIONS

Asawanonda et al., 2000, "308-nm excimer laser for the treatment of psoriasis: a dose-response study."Arach. Dermatol. 136:619-24.

(Continued)

*Primary Examiner* — Brian Jennison
(74) *Attorney, Agent, or Firm* — Jones Day

(57) ABSTRACT

A cathode assembly and a method for generation of pulsed plasma are disclosed. The cathode assembly comprises a cathode holder connected to multiple longitudinally aligned cathodes, preferably of the same diameter, and different lengths. The method is characterized by forming an electric arc between the cathodes in the assembly and an anode by passing DC current of a predetermined magnitude. Once the arc is established the current is reduced to the magnitude sufficient to sustain an electric arc, or a slightly larger magnitude, thereby reducing the area of arc attachment to a single cathode. Once the area of attachment has been reduced, the current is raised to the operational level of the pulse, while the area of attachment does not increase significantly.

18 Claims, 15 Drawing Sheets

(56) References Cited

U.S. PATENT DOCUMENTS 3,903,891 A 9/1975 Brayshaw
3,914,573 A 10/1975 Muehlberger
3,938,525 A 2/1976 Coucher
3,991,764 A 11/1976 Incropera et al.
3,995,138 A 11/1976 Kalev et al.
4,029,930 A 6/1977 Sagara et al.
4,035,684 A 7/1977 Svoboda et al.
4,041,952 A 8/1977 Morrison, Jr. et al.
4,201,314 A 5/1980 Samuels et al.
4,256,779 A 3/1981 Sokol et al.
4,317,984 A 3/1982 Fridlyand
4,397,312 A 8/1983 Molko
4,445,021 A 4/1984 Irons et al.
4,620,080 A 10/1986 Arata et al.
4,661,682 A 4/1987 Gruner et al.
4,672,163 A 6/1987 Matsui et al.
4,674,683 A 6/1987 Fabel
4,682,598 A 7/1987 Beraha
4,696,855 A 9/1987 Pettit, Jr. et al.
4,711,627 A 12/1987 Oeschsle et al.
4,713,170 A * 12/1987 Saibic ............................ 210/85
4,743,734 A 5/1988 Garlanov et al.
4,764,656 A 8/1988 Browning
4,777,949 A 10/1988 Perlin
4,780,591 A 10/1988 Bernecki et al.
4,781,175 A 11/1988 McGreevy et al.
4,784,321 A 11/1988 Delaplace
4,785,220 A 11/1988 Brown et al.
4,839,492 A 6/1989 Bouchier et al.
4,841,114 A 6/1989 Browning
4,853,515 A 8/1989 Willen et al.
4,855,563 A 8/1989 Beresnev et al.
4,866,240 A 9/1989 Webber
4,869,936 A 9/1989 Moskowitz et al.
4,874,988 A 10/1989 English
4,877,937 A 10/1989 Muller
4,916,273 A 4/1990 Browning
4,924,059 A 5/1990 Rotolico et al.
5,008,511 A * 4/1991 Ross ........................ 219/121.48
5,013,883 A 5/1991 Fuimefreddo et al.
5,100,402 A 3/1992 Fan
5,144,110 A 9/1992 Marantz et al.
5,151,102 A 9/1992 Kamiyama et al.
5,201,900 A 4/1993 Nardella
5,207,691 A 5/1993 Nardella
5,211,646 A 5/1993 Alperovich et al.
5,217,460 A 6/1993 Knoepfler
5,225,652 A 7/1993 Landes
5,227,603 A 7/1993 Doolette et al.
5,261,905 A 11/1993 Doresey
5,285,967 A 2/1994 Weidman
5,332,885 A * 7/1994 Landes .................... 219/121.47
5,352,219 A 10/1994 Reddy
5,396,882 A 3/1995 Zapol
5,403,312 A 4/1995 Yates et al.
5,406,046 A 4/1995 Landes
5,408,066 A 4/1995 Trapani et al.
5,412,173 A 5/1995 Muehlberger
5,445,638 A 8/1995 Rydell et al.
5,452,854 A 9/1995 Keller
5,460,629 A 10/1995 Shlain et al.
5,485,721 A 1/1996 Steenborg
5,514,848 A 5/1996 Ross et al.
5,519,183 A 5/1996 Mueller
5,527,313 A 6/1996 Scott et al.
5,573,682 A 11/1996 Beason, Jr.
5,582,611 A 12/1996 Tsuruta et al.
5,620,616 A 4/1997 Anderson et al.
5,629,585 A 5/1997 Altmann
5,637,242 A 6/1997 Muehlberger
5,640,843 A 6/1997 Aston
5,662,680 A 9/1997 Desai
5,665,085 A 9/1997 Nardella
5,679,167 A 10/1997 Muehlberger
5,680,014 A 10/1997 Miyamoto et al.
5,688,270 A 11/1997 Yates et al.
5,697,281 A 12/1997 Eggers et al.
5,697,882 A 12/1997 Eggers et al.
5,702,390 A 12/1997 Austin et al.
5,720,745 A 2/1998 Farin et al.
5,733,662 A 3/1998 Bogachek
5,797,941 A 8/1998 Schulze et al.
5,827,271 A 10/1998 Buysse et al.
5,833,690 A 11/1998 Yates et al.
5,837,959 A 11/1998 Muehlberger et al.
5,843,079 A 12/1998 Suslov
5,858,469 A 1/1999 Sahoo et al.
5,858,470 A 1/1999 Bernecki et al.
5,897,059 A 4/1999 Muller
5,906,757 A 5/1999 Kong et al.
5,932,293 A 8/1999 Belashchenko et al.
6,003,788 A 12/1999 Sedov
6,042,019 A 3/2000 Rusch
6,099,523 A 8/2000 Kim et al.
6,114,649 A 9/2000 Delcea
6,135,998 A 10/2000 Palanker
6,137,078 A 10/2000 Keller
6,137,231 A 10/2000 Anders
6,162,220 A 12/2000 Nezhat
6,169,370 B1 1/2001 Platzer
6,181,053 B1 1/2001 Roberts
6,202,939 B1 3/2001 Delcea
6,273,789 B1 8/2001 LaSalle et al.
6,283,386 B1 9/2001 Van Steenkiste et al.
6,352,533 B1 3/2002 Ellman et al.
6,386,140 B1 5/2002 Muller et al.
6,392,189 B1 5/2002 Delcea
6,443,948 B1 9/2002 Suslov
6,475,215 B1 11/2002 Tanrisever
6,514,252 B2 2/2003 Nezhat et al.
6,515,252 B1 2/2003 Girold
6,528,947 B1 3/2003 Chen et al.
6,548,817 B1 4/2003 Anders
6,562,037 B2 5/2003 Paton et al.
6,629,974 B2 10/2003 Penny et al.
6,657,152 B2 12/2003 Shimazu
6,669,106 B2 12/2003 Delcea
6,676,655 B2 1/2004 McDaniel et al.
6,780,184 B2 8/2004 Tanrisever
6,845,929 B2 1/2005 Dolatabadi et al.
6,886,757 B2 5/2005 Byrnes et al.
6,958,063 B1 10/2005 Soll et al.
6,972,138 B2 12/2005 Heinrich et al.
6,986,471 B1 1/2006 Kowalsky et al.
7,025,764 B2 4/2006 Paton et al.
7,030,336 B1 4/2006 Hawley
7,118,570 B2 10/2006 Tetzlaff et al.
7,589,473 B2 9/2009 Suslov
2001/0041227 A1 11/2001 Hislop
2002/0013583 A1 1/2002 Camran et al.
2002/0071906 A1 6/2002 Rusch
2002/0091385 A1 7/2002 Paton et al.
2002/0097767 A1 7/2002 Krasnov
2003/0030014 A1 2/2003 Wieland et al.
2003/0040744 A1 2/2003 Latterell et al.
2003/0075618 A1 4/2003 Shimazu
2003/0114845 A1 6/2003 Paton et al.
2003/0125728 A1 7/2003 Nezhat et al.
2003/0178511 A1 9/2003 Dolatabadi et al.
2003/0190414 A1 10/2003 Van Steenkiste
2004/0018317 A1 1/2004 Heinrich et al.
2004/0064139 A1 4/2004 Yossepowitch
2004/0068304 A1 4/2004 Paton et al.
2004/0116918 A1 6/2004 Konesky
2004/0124256 A1 7/2004 Itsukaichi et al.
2004/0129222 A1 7/2004 Nylen et al.
2004/0195219 A1 10/2004 Conway
2005/0082395 A1 4/2005 Gardega
2005/0120957 A1 6/2005 Kowalsky et al.
2005/0192610 A1 9/2005 Houser et al.
2005/0192611 A1 9/2005 Houser
2005/0192612 A1 9/2005 Houser et al.
2005/0234447 A1 10/2005 Paton et al.
2005/0255419 A1 11/2005 Belashchenko et al.

(56) References Cited

U.S. PATENT DOCUMENTS

| | | | | |
|---|---|---|---|---|
| 2006/0004354 | A1 | 1/2006 | Suslov | |
| 2006/0037533 | A1 | 2/2006 | Belashchenko et al. | |
| 2006/0049149 | A1 | 3/2006 | Shimazu | |
| 2006/0090699 | A1 | 5/2006 | Muller | |
| 2006/0091116 | A1 | 5/2006 | Suslov | |
| 2006/0091117 | A1 | 5/2006 | Blankenship et al. | |
| 2006/0091119 | A1 | 5/2006 | Zajchowski et al. | |
| 2006/0108332 | A1 | 5/2006 | Belashchenko | |
| 2006/0189976 | A1 | 8/2006 | Karni et al. | |
| 2006/0217706 | A1 | 9/2006 | Lau et al. | |
| 2006/0287651 | A1 | 12/2006 | Bayat | |
| 2007/0021747 | A1 | 1/2007 | Suslov | |
| 2007/0021748 | A1 | 1/2007 | Suslov | |
| 2007/0029292 | A1 | 2/2007 | Suslov | |
| 2007/0038214 | A1 | 2/2007 | Morley et al. | |
| 2007/0138147 | A1 | 6/2007 | Molz et al. | |
| 2007/0173871 | A1 | 7/2007 | Houser et al. | |
| 2007/0173872 | A1 | 7/2007 | Neuenfeldt | |
| 2007/0191828 | A1 | 8/2007 | Houser et al. | |
| 2008/0015566 | A1 | 1/2008 | Livneh | |
| 2008/0071206 | A1 | 3/2008 | Peters | |
| 2008/0114352 | A1 | 5/2008 | Long et al. | |
| 2008/0185366 | A1 | 8/2008 | Suslov | |
| 2008/0246385 | A1* | 10/2008 | Schamiloglu et al. | 313/62 |
| 2009/0039790 | A1 | 2/2009 | Suslov | |

FOREIGN PATENT DOCUMENTS

| | | | |
|---|---|---|---|
| CA | 983586 | | 2/1979 |
| CA | 1 144 104 | | 4/1983 |
| CA | 1 308 722 | | 10/1992 |
| CA | 2594515 | | 7/2006 |
| CN | 85107499 | B | 4/1987 |
| CN | 1331836 | A | 1/2002 |
| CN | 1557731 | | 12/2004 |
| CN | 1682578 | A | 10/2005 |
| DE | 2033072 | | 2/1971 |
| DE | 10127261 | | 9/1993 |
| DE | 4209005 | | 12/2002 |
| EP | 0 282 677 | | 9/1988 |
| EP | 0 411 170 | | 2/1991 |
| EP | 0 748 149 | | 12/1996 |
| EP | 0851040 | | 7/1998 |
| EP | 1293169 | | 3/2003 |
| EP | 1570798 | | 9/2005 |
| ES | 2026344 | | 4/1992 |
| FR | 2 193 299 | | 2/1974 |
| FR | 2 567 747 | | 1/1986 |
| GB | 751735 | | 7/1956 |
| GB | 921016 | | 3/1963 |
| GB | 1 125 806 | | 9/1968 |
| GB | 1 176 333 | | 1/1970 |
| GB | 1 268 843 | | 3/1972 |
| GB | 1268843 | | 3/1972 |
| GB | 2407050 | | 4/2005 |
| JP | 47009252 | | 3/1972 |
| JP | 52-117255 | A | 10/1977 |
| JP | 54120545 | | 2/1979 |
| JP | 57001580 | | 1/1982 |
| JP | 57068269 | | 4/1982 |
| JP | 6113600 | A | 1/1986 |
| JP | A-S61-193783 | | 8/1986 |
| JP | A-S61-286075 | | 12/1986 |
| JP | 62123004 | | 6/1987 |
| JP | 1198539 | | 8/1989 |
| JP | 1-319297 | A | 12/1989 |
| JP | 1319297 | A | 12/1989 |
| JP | 3 043 678 | | 2/1991 |
| JP | 06262367 | | 9/1994 |
| JP | 9299380 | | 11/1997 |
| JP | 10024050 | | 1/1998 |
| JP | 10234744 | | 9/1998 |
| JP | 10504751 | | 12/1998 |
| JP | 2002541902 | | 12/2002 |
| JP | 2005539143 | | 12/2005 |
| JP | 2008036001 | | 2/2008 |
| JP | 2008-284580 | A | 11/2008 |
| MX | PA04010281 | | 6/2005 |
| RU | 2178684 | | 1/2002 |
| RU | 2183480 | | 6/2002 |
| RU | 2183946 | | 6/2002 |
| WO | WO 92/19166 | | 11/1992 |
| WO | WO 96/06572 | | 3/1996 |
| WO | WO 97/11647 | | 4/1997 |
| WO | WO 01/62169 | | 8/2001 |
| WO | WO 02/30308 | | 4/2002 |
| WO | WO 03/028805 | | 4/2003 |
| WO | WO 2004/028221 | | 4/2004 |
| WO | WO 2004/030551 | | 4/2004 |
| WO | WO 2004/105450 | | 12/2004 |
| WO | WO 2005/099595 | | 10/2005 |
| WO | WO 2006/012165 | | 2/2006 |
| WO | WO 2007/003157 | | 1/2007 |
| WO | WO 2007/006516 | | 1/2007 |
| WO | WO 2007/006517 | | 1/2007 |
| WO | WO 2007/040702 | | 4/2007 |

OTHER PUBLICATIONS

Coven et al., 1999, "PUVA-induced lymphocyte apoptosis: mechanism of action in psoriasis." Photodermatol. Photoimmunol. Photomed. 15:22-7.

Dabringhausen et al., 2002, "Determination of HID electrode falls in a model lamp I: Pyrometric measurements." J. Phys. D. Appl. Phys. 35:1621-1630.

Davis J.R. (ed) ASM Thermal Spray Society, Handbook of Thermal Spray Technology, 2004, U.S. 42-168.

Feldman et al., 2002, "Efficacy of the 308-nm excimer laser for treatment of psoriasis: results of a multicenter study." J. Am Acad. Dermatol. 46:900-6.

Gerber et al., 2003, "Ultraviolet B 308-nm excimer laser treatment of psoriasis: a new phototherapeutic approach." Br. J. Dermatol. 149:1250-8.

Honigsmann, 2001, "Phototherapy for psoriasis." Clin. Exp. Dermatol. 26:343-50.

International-type Search report dated Jan. 18, 2006, Swedish App. No. 0501603-5.

International-type Search report dated Jan. 18, 2006, Swedish App. No. 0501602-7.

International-type Search Report, dated Jan. 18, 2006, Swedish App. No. 0501604-3.

Lichtenberg et al., 2002, "Observation of different modes of cathodic arc attachment to HID electrodes in a model lamp." J. Phys. D. Appl. Phys. 35:1648-1656.

PCT International Search Report dated Feb. 14, 2007, International App. No. PCT/EP2006/006688.

PCT International Search Report dated Feb. 22, 2007, International App. No. PCT/EP2006/006689.

PCT International Search Report dated Feb. 22, 2007, International App. No. PCT/EP2006/006690.

PCT International Search Report, dated Oct. 23, 2007, International App. No. PCT/EP2007/000919.

PCT Written Opinion of the International Searching Authority dated Feb. 14, 2007, International App. No. PCT/EP2006/006688.

PCT Written Opinion of the International Searching Authority dated Feb. 22, 2007, International App. No. PCT/EP2006/006689.

PCT Written Opinion of the International Searching Authority dated Feb. 22, 2007, International App. No. PCT/EP2006/006690.

PCT Written Opinion of the International Searching Authority dated Oct. 23, 2007, International App. No. PCT/EP2007/000919.

Schmitz & Riemann, 2002, "Analysis of the cathode region of atmospheric pressure discharges." J. Phys. D. Appl. Phys. 35:1727-1735.

Trehan & Taylor, 2002, "Medium-dose 308-nm excimer laser for the treatment of psoriasis." J. Am. Acad. Dermatol. 47:701-8.

PCT International Preliminary Report on Patentability and Written Opinion of the International Searching Authority, dated Aug. 4, 2009, International App. No. PCT/EP2007/000919.

Office Action dated Mar. 13, 2009 of U.S. Appl. No. 11/701,911.

Office Action dated Mar. 19, 2009 of U.S. Appl. No. 11/482,580.

(56) References Cited

OTHER PUBLICATIONS

Office Action dated Oct. 18, 2007 of U.S. Appl. No. 11/701,911.
Office Action dated Feb. 1, 2008 of U.S. Appl. No. 11/482,580.
Office Action dated Apr. 17, 2008 of U.S. Appl. No. 11/701,911.
PCT International Search Report PCT/EP2007/006939, dated May 26, 2008.
PCT Invitation to Pay Additional Fees PCT/EP2007/006940, dated May 20, 2008.
PCT Written Opinion of the International Searching Authority PCT/EP2007/006939, dated May 26, 2008.
PCT Written Opinion of the International Searching Authority PCT/EP2007/006940.
PCT International Search Report PCT/EP2007/006940.
Video—Tumor Destruction Using Plasma Surgery, by Douglas A. Levine, M.D.
Video—Laparoscopic Management of Pelvic Endometriosis, by Ceana Nezhat, M.D.
Video—Tissue Coagulation, by Denis F. Branson, M.D.
Office Action of U.S. Appl. No. 11/482,583, dated Oct. 18, 2009.
Chinese Office Action of Chinese application No. 2012220800745680, dated Nov. 13, 2012.
Office Action of U.S. Appl. No. 12/696,411, dated Dec. 5, 2012.
Office Action of U.S. Appl. No. 11/482,582, dated Dec. 6, 2010.
Office Action of U.S. Appl. No. 11/482,581, dated Dec. 8, 2010.
Notice of Allowance of U.S. Appl. No. 11/701,911, dated Dec. 6, 2010.
Chinese Office Action of Chinese application No. 200780052471.5, dated Dec. 5, 2012.
Japanese Office Action of application No. 2009-547536, dated Feb. 15, 2012.
Chinese Office Action of application No. 200780100857.9, dated Nov. 28, 2011 (with English translation).
International Search Report of application No. PCT/EP2010/060641, dated Apr. 14, 2011.
Written Opinion of International application No. PCT/EP2010/060641, dated Apr. 14, 2011.
Office Action of U.S. Appl. No. 13/357,895, dated Mar. 29, 2012.
Office Action of U.S. Appl. No. 11/482,580, dated Apr. 11, 2012.
Office Action of U.S. Appl. No. 13/358,934, dated Apr. 24, 2012.
Japanese Office Action of application No. 2010-519340, dated Mar. 13, 2012 (with translation).
Chinese Office Action of application No. 200780100858.3, dated Apr. 27, 2012 (with English translation).
Japanese Office Action of application No. 2010-519339, dated Apr. 3, 2012 (with English translation).
Office Action of U.S. Appl. No. 11/482,582, dated May 23, 2011.
Notice of Allowance of U.S. Appl. No. 12/557,645, dated May 26, 2011.
European Office Action of application No. 07786583.0-1226, dated Jun. 29, 2010.
Office Action of U.S. Appl. No. 11/701,911 dated Apr. 2, 2010.
Office Action of U.S. Appl. No. 11/482,582, dated Jun. 23, 2010.
Office Action of U.S. Appl. No. 11/482,581, dated Jun. 24, 2010.
Office Action of U.S. Appl. No. 11/701,911 dated Jul. 19, 2010.
Chinese Office Action of application No. 200780052471.5, dated May 25, 2012 (with English translation).
Chinese Office Action of application No. 200780100857.9, dated May 25, 2012 (with English translation).
Chinese Office Action of application No. 200680030225.5, dated Jun. 11, 2010.
Chinese Office Action of application No. 200680030216.6, dated Oct. 26, 2010.
Chinese Office Action of application No. 200680030194.3, dated Jan. 31, 2011.
Chinese Office Action of application No. 200680030225.5, dated Mar. 9, 2011.
Japanese Office Action (translation) of application No. 2008-519873, dated Jun. 10, 2011.
Notice of Allowance and Fees Due of U.S. Appl. No. 13/358,934, dated Sep. 5, 2012.
Office Action of U.S. Appl. No. 13/357,895, dated Sep. 7, 2012.
Chinese Office Action of Chinese application No. 200780100858.3, dated Aug. 29, 2012.
Office Action of U.S. Appl. No. 11/482,580, dated Oct. 24, 2012.
Notice of Allowance and Fees Due of U.S. Appl. No. 11/482,581, Oct. 28, 2011.
Notice of Allowance and Fees Due of U.S. Appl. No. 11/482,582, Sep. 23, 2011.
Supplemental Notice of Allowability of U.S. Appl. No. 11/482,582, Oct. 12, 2011.
Supplemental Notice of Allowability of U.S. Appl. No. 11/482,582, Oct. 25, 2011.
Office Action of U.S. Appl. No. 12/557,645, dated Nov. 26, 2010.
Chinese Office Action of application No. 2007801008583, dated Oct. 19, 2011 (with English translation).
U.S. Appl. No. 12/841,361, filed Jul. 22, 2010, Suslov.
International Search Report of International application No. PCT/EP2010/051130, dated Sep. 27, 2010.
Written Opinion of International application No. PCT/EP2010/051130, dated Sep. 27, 2010.
Severtsev et al. 1997, "Polycystic liver disease: sclerotherapy, surgery and sealing of cysts with fibrin sealant", European Congress of the International Hepatobiliary Association, Hamburg, Germany Jun. 8-12; p. 259-263.
Severtsev et al., "Comparison of different equipment for final haemostasis of the wound surface of the liver following resection", Dept. of Surgery, Postgraduate and Research Centre, Medical Centre of the Directorate of Presidential Affairs of the Russian Federation, Moscow, Russia—K030819, 1997.
PCT Written Opinion of the International Searching Authority PCT/EP2007/006940, Jul. 11, 2008.
PCT International Search Report PCT/EP2007/006940, Jul. 11, 2008.
Office Action of U.S. Appl. No. 12/841,361, dated Jul. 31, 2013.
Notice of Allowance and Fees Due of U.S. Appl. No. 12/696,411, dated Aug. 12, 2013.
Final Office Action of U.S. Appl. No. 12/696,411, dated Jun. 10, 2013.
Notice of Allowance and Fees Due of U.S. Appl. No. 13/357,895, dated Feb. 21, 2013.
Chinese Office Action of Chinese application No. 200780100857.9, dated May 30, 2013.
Canadian Office Action of Canadian application No. 2,695,650, dated Jun. 18, 2013.
Canadian Office Action of Canadian application No. 2,695,902, dated Jun. 12, 2013.
Examiner's Answer to Applicant's Appeal Brief in U.S. Appl. No. 11/482,580, dated Jun. 18, 2013.
Video—Tumor Destruction Using Plasma Surgery, by Douglas A. Levine, M.D., Apr. 9, 2008.
Video—Laparoscopic Management of Pelvic Endometriosis, by Ceana Nezhat, M.D., Nov. 12, 2007.
Video—Tissue Coagulation, by Denis F. Branson, M.D., Dec. 4, 2008.
Office Action of U.S. Appl. No. 11/701,911, dated Sep. 29, 2009.
Plasma Surgical Headlines Article: Atlanta, Feb. 2, 2010—"New Facilities Open in UK and US".
Plasma Surgical Headlines: Atlanta, Feb. 2, 2010—"PlasmaJet to be Featured in Live Case at Endometriosis 2010 in Milan, Italy".
Plasma Surgical Headlines Article: Chicago, Sep. 17, 2008—"PlasmaJet Named Innovation of the Year by the Society of Laparoendoscopic Surgeons".
Marino, M.D., "A new option for patients facing liver resection surgery", Thomas Jefferson University Hospital, 2010.
Branson, M.D., 2005, "Preliminary experience with neutral plasma, a new coagulation technology, in plastic surgery", Fayetteville, NY.
Merloz, 2007, "Clinical evaluation of the Plasma Surgical PlasmaJet tissue sealing system in orthopedic surgery—Early report", Orthopedic Surgery Department, University Hospital, Grenoble, France.
Charpentier et al., 2008, "Multicentric medical registry on the use of the Plasma Surgical PlasmaJet System in thoracic surgery", Club Thorax.

(56) References Cited

OTHER PUBLICATIONS

Iannelli et al., 2005, "Neual plasma coagulation (NPC)—A preliminary report on a new technique for post-bariatric corrective abdominoplasty", Department of Digestive Surgerv, University Hospital, Nice, France.
Gugenheim et al., 2006, "Open, muliticentric, clinical evaluation of the technical efficacy, reliability, safety, and clinical tolerance of the plasma surgical PlasmaJet System for intra-operative coagulation in open and laparoscopic general surgery". Department of Digestive Surgery, University Hossital, Nice, France.
Sonoda et al., "Pathologic analysis of ex-vivo plasma energy tumor destruction in patients with ovarian or peritoneal cancer", Gynecology Service, Department of Surgery—Memorial Sloan-Kettering Cancer Center, New York, NY—Poster, 2009.
White Paper—Plasma Technology and its Clinical Application: An introduction to Plasma Surgery and the PlasmaJet—a new surgical tehnology.
White Paper—A Tissue Study using the PlasmaJet for coagulation: A tissue study comparing the PlasmaJet with argon enhanced electrosurgery and fluid coupled electrosurgery, Jun. 2008.
PlasmaJet English Brochure, 2009.
Plasma Surgery: A Patient Safety Solution (Study Guide 002), May 2008.
News Release and Video—2009, New Sugical Technology Offers Better Outcomes for Women's Reproductive Disorders: Stanford First in Bay Area to Offer PlasmaJet, Stanford Hospital and Clinics.
www.plasmasurgical.com. as of Feb. 18, 2010.
510(k) Summary, dated Oct. 30, 2003.
510(k) Summary, dated Jun. 2, 2008.
International Preliminary Report on Patentability of International application No. PCT/EP2007/006939, dated Feb. 9, 2010.
International Preliminary Report on Patentability of Internatonal application No. PCT/EP2007/006940, daed Feb. 9, 2010.
U.S. Appl. No. 12/696,411; Suslov, Jan. 29, 2010.
U.S. Appl. No. 12/557,645; Suslov, Sep. 11, 2009.
510(k) Notification (21 CFR 807.90(e)) for the Plasma Surgical Ltd. PlasmaJet® Neutral Plasma Surgery System, Section 10—Executive Summa—K080197, Jan. 25, 2008.
Aptekman, 2007, "Spectroscopic analysis of the PlasmaJet argon plasma with 5mm-0.5 coag-cut handpieces", Document PSSRP-106-K080197.
Chen et al., 2006, "What do we know about long laminar plasma jets?", Pure Appl Chem; 78(6):1253-1264.
Cheng et al., 2006, "Comparison of laminar and turbulent thermal plasma jet characteristics—a modeling study", Plasma Chem Plasma Process; 26:211-235.
CoagSafe™ Neutral Plasma Coagulator Operator Manual, Part No. OMC-2100-1. Revision 1.1, dated Mar. 2003—Appendix 1of K030819.
Deb et al., "Histological quantification of the tissue damage caused in vivo by neutral PlasmaJet coagulator", Nottingham University Hospitals, Queen's medical Centre, Nottingham NG7 2UH—Poster, Oct. 2009.
Electrosurgical Generators Force FX™ Electrosurgical Generators by ValleyLab—K080197, Sep. 2002.
Erbe APC 300 Argon Plasma Coagulation Unit for Endoscopic Applications, Brochure—Appendix 4 of K030819, 1997.
Force Argon™ II System, Improved precision and control in electrosurgery, by Valleylab—K080197, Aug. 2006.
Haines et al., "Argon neutral plasma energy for laparoscopy and open surgery recommended power settings and applications", Royal Surrey County Hospital, Guildford Surrey, UK, Oct. 2009.
Haemmerich et al., 2003, "Hepatic radiofrequency ablation with internally cooled probes: effect of coolant temperature on lesion size", IEEE Transactions of Biomedical Engineering; 50(4):493-500.
Huang et al., 2008, "Laminar/turbulent plasma jets generated at reduced pressure", IEEE Transaction on Plasma Science; 36(4):1052-1053.
Letter to FDA re: 501(k) Notification (21 CFR 807.90(e)) for the PlasmaJet® Neutral Plasma Surgery System, dated Jun. 2, 2008—K080197.
McClurken et al., "Histologic characteristics of the TissueLink Floating Ball device coagulation on porcine liver", TissueLink Medical, Inc., Dover, NH; Pre-Clinical Study #204, 2002.
McClurken et al., "Collagen shrinkage and vessel sealing", TissueLink Medical, Inc., Dover, NH; Technical Brief #300, 2001.
Nezhat et al., 2009, "Use of neutral argon plasma in the laparoscopic treatment of endometriosis", Journal of the Society of Laparoendoscopic Surgeons.
Notice of Allowance dated May 15, 2009, of U.S. Appl. No. 11/890,938.
Palanker et al., 2008, "Electrosurgery with cellular precision", IEEE Transactions of Biomedical Engineering; 55(2):838-841.
Pan et al., 2001, "Generation of long, laminar plasma jets at atmospheric pressure and effects of low turbulence", Plasma Chem Plasma Process; 21(1):23-35.
Pan et al., 2002, "Characteristics of argon laminar DC Plasma Jet at atmospheric pressure", Plasma Chem and Plasma Proc: 22(2):271-283.
PlasmaJet Neutral Plasma Coagulator Operator Manual, Part No. OMC-2100-1 (Revision 1.7, dated May 2004)—K030819, Mar. 2003.
PlasmaJet Neutral Plasma Coagulator Brochure mpb 2100—K080197, May 2004.
PlasmaJet Operator Manual Part No. OMC-2130-EN (Revision 3.1/Draft) dated May 2008—K080197.
Premarket Notification 510(k) Submission, Plasma Surgical Ltd.—PlasmaJet™ (formerly CoagSafe™) Neutral Plasma Coagulator, Additional information provided in response to the e-mail request dated Jul. 14, 2004—K030819.
Premarket Notification 510(k) Submission, Plasma Surgical Ltd. CoagSafe™, Section 4 Device Description—K030819, 2004.
Premarket Notification 510(k) Submission, Plasma Surgical Ltd. PlasmaJet®, Section 11 Device Description—K080197, 2004.
Premarket Notification 510(k) Submission, Plasma Surgical Ltd. CoagSafe™, Section 5 Substantial Equivalence—K030819, 2004.
Report on the comparative analysis of morphological changes in tissue from different organs after using the PlasmaJet version 3 (including cutting handpieces), Aug. 2007—K080197.
Severtsev et al., "Comparison of different equipment for final haemostasis of the wound surface of the liver following resection", Dept. of Surgery, Postgraduate and Research Centre, Medical Centre of the Directorate of Presidential Affairs of the Russian Federation, Moscow, Russia—K030819, 2007.
The Edge in Electrosurgery From Birtcher, Brochure—Appendix 4 of K030819, 1999.
The Valleylab FORCE GSU System, Brochure—Appendix 4 of K030819, 1991.
Treat, "A new thermal device for sealing and dividing blood vessels", Dept. of Surgery, Columbia University, New York, NY, 2005.
Zenker, 2008, "Argon plasma coagulation", German Medical Science; 3(1):1-5, 2008.
Device drawings submitted pursuant to MPEP §724, Aug. 26, 2007.

* cited by examiner

CATHODE ASSEMBLY AND METHOD FOR PULSED PLASMA GENERATION

FIELD OF INVENTION

The present invention relates to a cathode assembly of plasma generating devices and a method of generating plasma, and more particularly to pulsed plasma.

BACKGROUND

Generation of pulsed plasma with pulses and off-periods of relatively short duration presents a unique set of challenges. There are several limitations of the presently known plasma generating devices that make their use for generating pulsed plasma impracticable.

Generally, a plasma generating device comprises a cathode and an anode. A plasma generating gas, which is typically a noble gas, flows in a channel extending longitudinally between the cathode and through the anode. As the plasma generating gas traverses the plasma channel it is heated and converted to plasma by an electric arc established between the cathode and the anode. Portions of the plasma channel may be formed by one or more intermediate electrodes.

Generation of plasma occurs in three phases. The first phase, called a spark discharge, occurs when an electric spark is established between the cathode and the anode. The second phase, called a glow discharge, occurs when positively charged ions, formed as a result of the motion of negatively charged electrons in the electric spark, bombard the cathode. The third phase, called an arc discharge, occurs after a portion of the cathode is sufficiently heated by the ion bombardment that it begins to emit a sufficient number of electrons to sustain the current between the cathode and the anode for heating the plasma generating gas. The electric arc heats the plasma generating gas, which forms plasma. Each time high temperature plasma is generated, the plasma generating gas has to go through all three phases.

In the prior art devices, at startup, the current passing between the cathode and the anode is simply raised to the desired operational level. This rapid increase in the current, however, cannot be sustained during the spark discharge and glow discharge phases. Only once the arc discharge phase is reached and the cathode begins thermionically emitting electrons with a rate sufficient to support such a current, the applied operational level current begins to flow between the cathode and the anode. Attempting to pass a high, operational level, current through the cathode before it begins to thermionically emit electrons with sufficiently high rate to sustain such current exerts stress on the cathode, which ultimately causes its destruction after a relatively low number of startups.

Generation of pulsed plasma requires frequent startups of the plasma generating device in a rapid succession. For example, in skin treatment, a single session of treatment with pulsed plasma may require thousands of pulses and consequently thousands of startups. The prior art methods of starting up plasma-generating devices are unsuitable for pulsed plasma generation because the cathode may be damaged during the session.

Presently, two types of devices may be used for generation of pulses of ionized gas. The device disclosed in U.S. Pat. No. 6,629,974 is an example of the first type. In devices of this type, a corona discharge is generated by passing plasma generating gas, such as nitrogen, through an alternating electric field. The alternating electric field creates a rapid motion of the free electrons in the gas. The rapidly moving electrons strike out other electrons from the gas atoms, forming what is known as an electron avalanche, which in turn creates a corona discharge. By applying the electric field in pulses, pulsed corona discharge is generated. Among the advantages of this method for generating pulsed corona discharge is (1) the absence of impurities in the flow and (2) short start times that enable generation of a truly pulsed flow. For the purposes of this disclosure, a truly pulsed flow refers to a flow that completely ceases during the off period of the pulse.

A drawback of devices and methods of the first type is that the generated corona discharge has a fixed maximum temperature of approximately 2000° C. The corona discharge formed in the device never becomes high temperature plasma because it is not heated by an electric arc. Therefore, devices that generate pulsed corona discharge cannot be used for some applications that require a temperature above 2000° C. Accordingly, applications of devices of the first type are limited by the nature of the electrical discharge process, that is capable of producing a corona discharge, but not high temperature plasma.

Devices of the second type generate plasma by heating the flow of plasma generating gas passing through a plasma channel by an electric arc that is established between a cathode and an anode that forms the plasma channel. An example of a device of the second type is disclosed in U.S. Pat. No. 6,475,215. According to the disclosure of U.S. Pat. No. 6,475,215, as the plasma generating gas, preferably argon, traverses the plasma channel, a pulsed DC voltage is applied between the anode and the cathode. A predetermined constant bias voltage may or may not be added to the pulsed DC voltage. During a voltage pulse, the number of free electrons in the plasma generating gas increases, resulting in a decrease in the resistance of the plasma and an exponential increase of the electric current flowing through the plasma. During the off period, the number of free electrons in the plasma generating gas decreases, resulting in an increase in resistance of the plasma and an exponential decrease in the current flowing through the plasma. Although the current is relatively low during the off period, it never completely ceases. This low current, referred to as the standby current, is undesirable because a truly pulsed plasma flow is not generated. During the off period a continuous low-power plasma flow is maintained. In essence, the device does not generate pulsed plasma, but rather a continuous plasma flow with power spikes, called pulses, thus simulating pulsed plasma. Because the off-period is substantially longer than a pulse, the device outputs a significant amount of energy during the off period and, therefore, it cannot be utilized effectively for applications that require a truly pulsed plasma flow. For example, if the device is used for skin treatment, it may have to be removed from the skin surface after each pulse, so that the skin is not exposed to the low power plasma during the off period. This impairs the usability and safety of the device.

Dropping the current flow through the plasma to zero between pulses and restarting the device for each pulse of plasma is not practicable when using the device disclosed in U.S. Pat. No. 6,475,215. Restarting the device for each pulse would result in the rapid destruction of the cathode, as a result of passing a high current through the cathode without ensuring that it emits enough electrons for the plasma flow to support this current. Attempting to pass a high current through the cathode before it begins to emit electrons with sufficiently high rate to sustain such current exerts stress on the cathode, which ultimately causes its destruction. Alternatively, it is possible to increase slowly both the voltage between the cathode and the anode and the current passing through the plasma. This alternative is not practical either because the startup of the device for each pulse would be impermissibly long.

The inability of the device disclosed in U.S. Pat. No. 6,475,215, and other devices of this type presently known in the art, to generate a truly pulsed plasma flow is due to the structure of the device. When devices of this type startup there is some erosion of electrodes due to sputtering. This erosion results in separated electrode materials, such as metal particles, flowing in the plasma. When a continuous plasma flow is used, the startup impurities are a relatively minor drawback, because the startup, and the impurities associated with it, occur only once per treatment. It is therefore possible to wait a few seconds after the startup for the electrode particles to exit the device before beginning the actual treatment. However, waiting for impurities to exit the device when using a pulsed plasma flow is impractical because particles separate from electrodes for each pulse.

When the plasma flow has been previously created it takes just a few microseconds to increase or decrease the current in the plasma flow. Additionally, because there are no startups during treatment, impurities do not enter the plasma flow, and there is no stress on the cathode. However, sustaining even a low electrical current through the plasma continuously renders the device suboptimal for some applications that require a truly pulsed plasma flow, as discussed above.

Difficulties in generating a truly pulsed plasma flow by the means of heating the plasma generating gas with an electric arc are primarily due to the nature of the processes occurring on the cathode and the anode. In general, and for medical applications especially, it is critical to ensure operation free from the erosion of the anode and the cathode when the current rapidly increases. During the rapid current increase the temperature of the cathode may be low and not easily controlled during subsequent repetitions of the pulse. During the generation of an electric arc between the cathode and the anode, the area of attachment of the arc to the cathode strongly depends on the initial temperature of the cathode. When the cathode is cold, the area of attachment is relatively small. After several pulses the temperature of the cathode increases, so that during a rapid current increase the area of attachment expands over the entire surface area of the cathode and even over a cathode holder. Under these circumstances, the cathode fall begins to fluctuate and the cathode erosion begins. Furthermore, if the area of attachment of the electric arc reaches the cathode holder it begins to melt thus introducing undesirable impurities into the plasma flow. For the proper cathode functionality, it is necessary to control the exact location and the size of the area of attachment of the electric arc to the cathode surface during rapid current increases in each pulse of plasma.

An electric arc tends to attach to surface imperfections (also called irregularities) on the cathode. In the prior art, such surface imperfections were created by altering the shape of a cylindrical cathode. A typical surface imperfection used in the prior art is cathode tapering. Cathode tapering creates a tip to which the arc tends to attach. Another way to create an imperfection is by cutting a cylindrical cathode at an angle. This too creates an imperfection to which the arc tends to attach. Although these methods control the location of the electric arc attachment between continuous plasma flow sessions, they are not sufficient for controlling the size of that area for the pulsed plasma operation due to the gradual expansion of the area of the arc attachment, as described above.

Independently from these attempts of controlling the location and size of the area of the arc attachment, some prior art devices used multiple cathodes for various purposes. For example, in U.S. Pat. No. 1,661,579 multiple cathodes were used in a plasma-based light bulb for generating a spark between them. In U.S. Pat. No. 2,615,137 a plurality of cathodes are divided in three groups. Three-phase power is distributed between the cathodes so that one group is used during a phase for providing a pseudo-continuous mode of operation. In U.S. Pat. No. 3,566,185 a pair of cathodes is used for sputtering of metallic traces from the cathodes by using particles isolated between the cathodes by a magnetic field. In U.S. Pat. No. 4,785,220 multiple cathodes are provided in a revolving drum such that the cathodes may be interchanged without breaking the vacuum seal of a vacuum chamber in which electric discharges occur. U.S. Pat. No. 4,713,170 discloses a water purifying system in which multiple cathodes are spaced around an anode. This multi-cathode configuration is used for decreasing the disturbance on the flow of water passing through the purifier. In U.S. Pat. No. 5,089,707, a multiple cathode assembly of electrically insulated cathodes are used for extending the life of an ion beam apparatus by alternating a cathode involved in the electric arc generation. In U.S. Pat. No. 5,225,625 multiple parallel cathodes, spaced from each other, are used in a plasma spray device for expanding the cross section of the plasma flow to prevent clogging of a plasma channel with powder particles. In general, prior art references disclosing multiple cathodes are not concerned with problems associated with generation of pulsed plasma.

Accordingly, there is presently a need for a cathode assembly and a method of operating of a device using the cathode assembly that would overcome limitations of the prior art for truly pulsed plasma generation.

SUMMARY

A cathode assembly for pulsed plasma generation comprises a cathode holder connected to a plurality of longitudinally aligned cathodes. Preferably the cathodes in the assembly are clustered as close together as possible. The cathodes are preferably made of tungsten containing lanthanum. The cathodes preferably have the same diameter but different lengths. Optimally the length difference between the two cathodes closest in length approximately equals to the diameter of a cathode in the assembly, which is preferably 0.5 mm. The cathode assembly according to embodiments of this invention is used in devices for generating pulsed plasma based on the heating of a plasma generating gas by an electric arc established between one of the cathodes and an anode. In particular, the cathode assembly comprises (a) a cathode holder; and (b) a cluster of a plurality of longitudinally aligned cathodes connected to the cathode holder, with each cathode in physical contact with at least one other cathode.

In operation, in the preferred embodiment, a plasma generating gas is passed between the cathodes and the anode, preferably through a plasma channel. By applying a high frequency, high amplitude voltage wave between the anode and the cathodes, a large number of free electrons is produced. These electrons form a spark discharge. The spark ionizes the plasma generating gas, which enters the glow discharge phase. During the glow discharge, positive ions that are formed due to the ionization of the gas atoms bombard the cathodes, thus heating it. Once the ends of the cathodes toward the anode reach the temperature of therminonic electron emission, the plasma generating gas enters the arc discharge phase, and the arc is established between the cathodes and the anode. The arc attaches to all cathodes in the assembly.

After the arc is established between the cathodes and the anode, the current is reduced to the magnitude sufficient to sustain the arc or a slightly greater magnitude. This causes the area of the arc attachment to decrease. The area of attachment decreases so that the arc attaches to a single cathode. After this low current is maintained for a period of time, the current is raised to the operational level of the pulse. The area of attachment does not increase significantly, and electron emission occurs only from the single cathode. After the operational current is maintained for a desired duration, the device enters the off-period with no current and no voltage applied.

This method of operation avoids the problems of unstable operation associated with prior art methods. If a multi-cathode assembly is operated according to this method, the cathodes do not overheat and the area of attachment does not expand to the cathode holder. This ensures a stable operation of the plasma generating device. The method of operation also provides certain benefits when used in the cathode assemblies having a single cathode.

The method of generating a pulse of plasma comprises (a) passing a first current through one or more cathodes and an anode; (b) passing a second current through the one or more cathodes and the anode, the magnitude of the second current being less than the magnitude of the first current; (c) passing a third current through the one or more cathodes and the anode, the magnitude of the third current being greater than the magnitude of the first current; and (d) ceasing the third current passing through the one or more cathodes and the anode.

DESCRIPTION OF EMBODIMENTS

Figure 1:
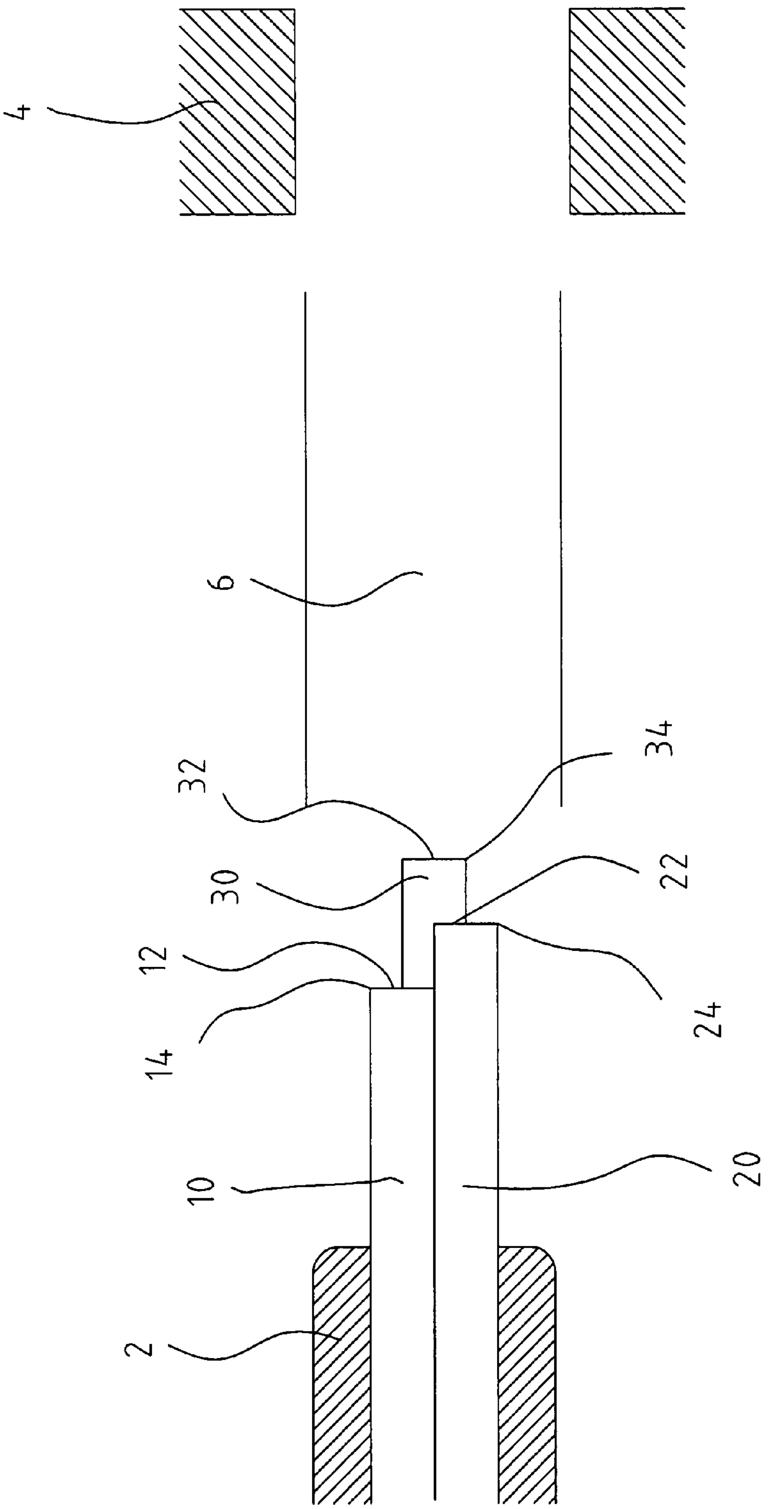
FIG. 1 illustrates a basic device for pulsed plasma generation.
Figure 2:
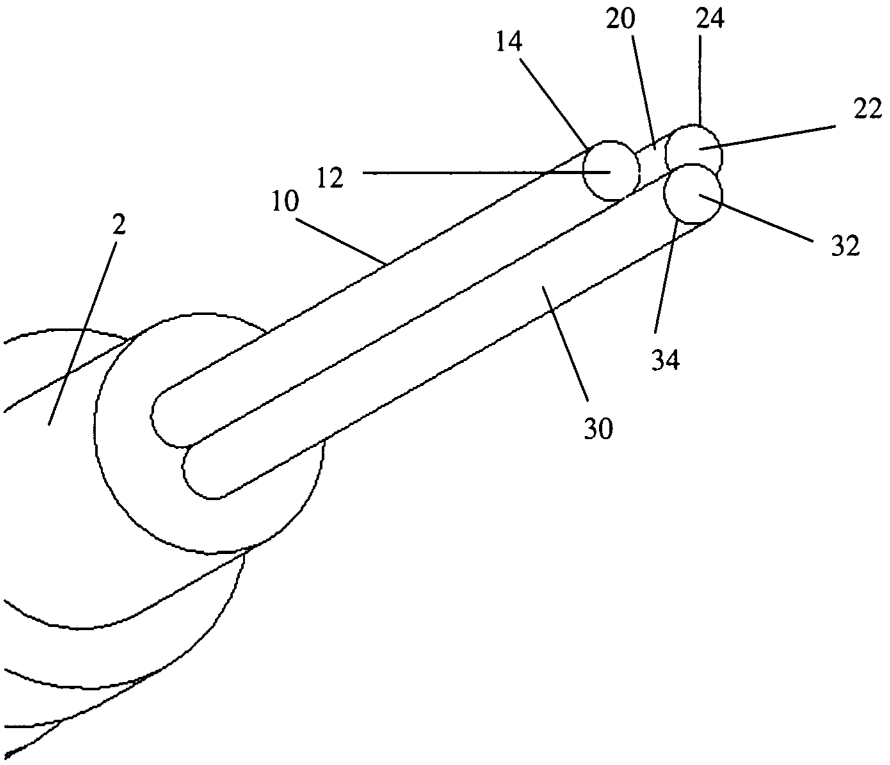
FIG. 2 illustrates a cathode assembly of the preferred embodiment in three dimensions.

In an exemplary embodiment, a cathode assembly having multiple cathodes is a part of a plasma generating device. There is no theoretical limit on the number of cathodes in the assembly, as long as there are at least two. FIG. 1 shows a schematic view of the longitudinal cross section of such a device. Cathode holder 2 holds three cathodes 10, 20, and 30 longitudinally aligned with one another. Anode 4 is located at a distance from the cathodes. In the preferred embodiment, initially, the cathodes have flat surfaces 12, 22, and 32, respectively, at the ends closest to anode 4 (the "anode ends"). The flat surface forms edges 14, 24, and 34, respectively. FIG. 2 shows a three dimensional view of the cathode assembly.

In terms of geometry, the cathodes must be clustered. By clustered it is meant that all of the cathodes are arranged as a single group with every cathode longitudinally touching at least one other cathode and none of the cathodes separate from the group. The cathodes preferably are clustered as close together as possible. However, it is sufficient that each cathode in the assembly is in physical contact with at least one other cathode in the cluster. Theoretically, the cathodes in the assembly may have different diameters. In the preferred embodiment, however, cathodes 10, 20, 30 have the same diameter, preferably 0.5 mm. In some embodiments, at least one cathode in the assembly has a length which is different from the length of at least one other cathode. In the preferred embodiment, all cathodes in the assembly have different lengths. Preferably the smallest difference in length between two cathodes is approximately equal to the diameter of a cathode, which is 0.5 mm in the preferred embodiment of the assembly.

In some embodiments, the device hosting the cathode assembly also comprises plasma channel 6 extending between cathodes 10, 20, 30 and through anode 4. In some embodiments, the plasma channel is formed by one or more intermediate electrodes. In some embodiments, the anode ends of cathodes 10, 20, 30 are located in a plasma chamber connected to the plasma channel. The cathode assembly may be used in other devices, such as for example pulsed plasma generating device shown in FIG. 3.

Devices that may host the cathode assembly are not limited to plasma generating devices, however. In some embodiments, the cathode assembly may be used in a light source or as a part of a communication device. In general, the cathode assembly may be used in any device that requires establishing electric arcs of short duration between cathodes and an anode.

Figure 3:
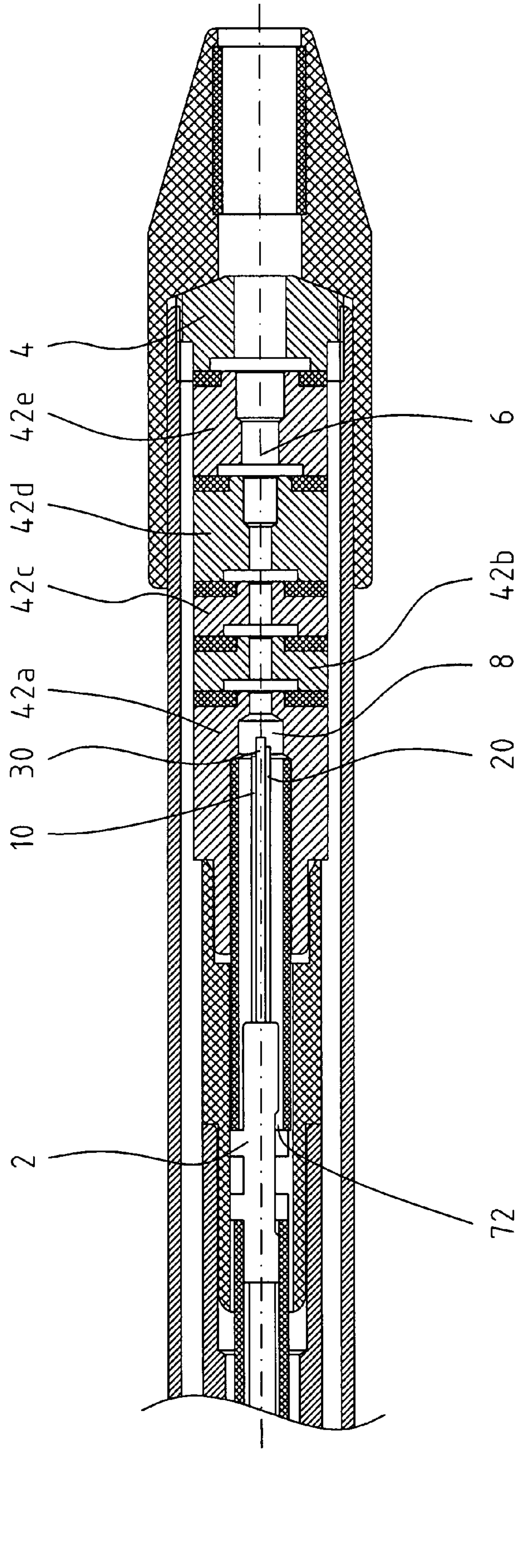
FIG. 3 illustrates a device for generating pulsed plasma adopted for skin treatment.

For the purposes of describing methods of operation, an embodiment of the device shown in FIG. 3 is used. It should be noted however, that the methods of operation described below would provide the same benefits if used in connection with the multi-cathode assembly in other devices. Furthermore, the methods of operation may be used in connection with single-cathode assemblies, although using these methods of operation on a multi-cathode assembly is more effective. The device shown in FIG. 3 comprises the cathode assembly shown in FIG. 2 having cathode holder 2 and cathodes 10, 20, and 30. The device further comprises anode 4 and one or more intermediate electrodes 42*a-e* electrically insulated from anode 4 and from each other. Plasma channel 6 is formed by the intermediate electrodes 42*a-e* and anode 4. In some embodiments, intermediate electrode 42*a* also forms a plasma chamber 8. During operation of the device, a plasma generating gas, typically a noble gas, such as argon, is introduced into the device through opening 72. The plasma generating gas flows along cathodes 10, 20, 30 into the plasma chamber 8, then into plasma channel 6, and then the plasma generating gas exits the device through the opening in anode 4.

In some embodiments, an extension nozzle is affixed at the anode end of the device. The extension nozzle forms an extension channel connected to the plasma channel. A tubular insulator element covers a longitudinal portion of the inside surface of the extension channel. Additionally, in some embodiments, the extension nozzle has one or more oxygen carrying gas inlets.

A plasma generating device, such as the one shown in FIG. 3 is typically connected to one or more electronic circuits that control (1) voltage applied between anode 4 and cathodes 10, 20, 30 and (2) current passing through cathodes 10, 20, 30, plasma generating gas in plasma channel 6, and anode 4. The circuit for controlling the current is a current source, known in the art. These circuits are used for generation of each pulse of plasma. All cathodes in the assembly are electrically connected to each other and are connected to the same circuits, so cathodes 10, 20, 30 have the same electric potential and there is no voltage between individual cathodes, only between anode 4 and all cathodes 10, 20, 30. The process of a plasma pulse formation is controlled by (1) applying the voltage between the cathodes and the anode and (2) controlling the current passing through the plasma generating gas.

As a brief overview, the process of plasma generation includes three phases: (1) a spark discharge, (2) a glow discharge, and (3) an arc discharge. An electric arc in the arc discharge phase heats the plasma generating gas flowing through plasma channel 6, forming plasma. Generation of each plasma pulse requires the plasma generating gas to go through all three phases. Prior to generation of a pulse, the resistance of the plasma generating gas is close to infinity. A small number of free electrons are present in the plasma generating gas due to ionization of atoms by cosmic rays.

To create a spark discharge a high amplitude, high frequency voltage wave is applied between anode 4 and cathodes 10, 20, 30. This wave increases the number of free electrons in plasma channel 6, between cathodes 10, 20, 30 and anode 4. Once a sufficient number of free electrons has been formed, a DC voltage is applied between anode 4 and cathodes 10, 20, 30 and a DC current is passed through cathodes 10, 20, 30, plasma generating gas, and anode 4, forming a spark discharge between cathodes 10, 20, 30 and anode 4.

After the spark discharge, the resistance of the plasma generating gas drops, and the glow discharge phase begins. During the glow discharge phase, positively charged ions are attracted to cathodes 10, 20, 30 under the influence of the electric field created by the voltage between the cathodes and anode 4. As cathodes 10, 20, 30 are being bombarded with ions, the temperature of the anode ends of the cathodes increases. Once the temperature reaches the temperature of thermionic electron emission, the arc discharge phase begins. Initially, the arc attaches to all cathodes in the assembly. The current passing through the plasma generating gas is then reduced, so the area of attachment decreases to almost the minimum area of attachment capable of sustaining the arc. Because the area of the arc attachment is small, the area of attachment is confined to a single cathode in the assembly. Therefore, the current required to sustain the arc discharge, which depends on a cathode's diameter, is relatively low. After the current has been reduced and maintained at that level for a period of time, it is increased rapidly to the operational level of a pulse. The area of the arc attachment increases insignificantly, and only a single cathode continues to emit electrons for the rest of the pulse. Decreasing the area of the arc attachment, and then maintaining that small area, so that only a single cathode emits electrons from a controlled area is critical to the operation of a truly pulsed plasma devices.

Figure 4A:
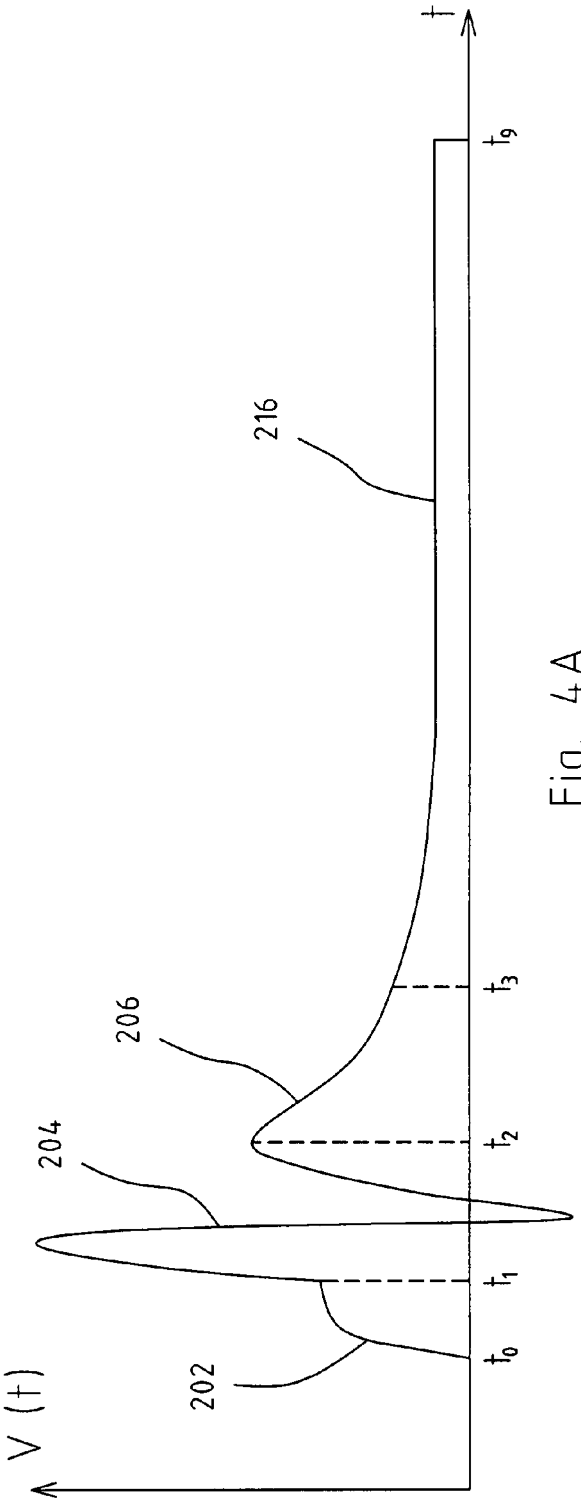
FIG. 4A illustrates a pattern of voltage between an anode and cathodes for generation of each pulse.
Figure 4B:
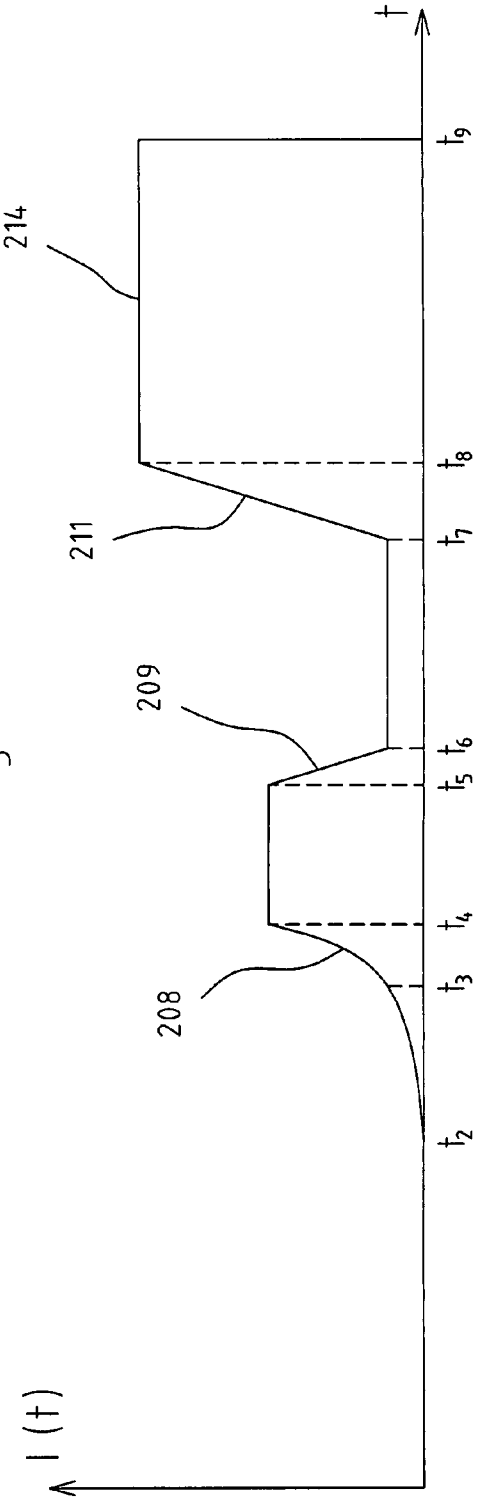
FIG. 4B illustrates a pattern of current applied to cathodes, plasma generating gas in a plasma channel, and an anode for generation of each pulse.

In greater detail, the following discussion of the method of pulsed plasma generation refers to FIGS. 4A-B; FIG. 4A shows the voltage applied between anode 4 and cathodes 10, 20, 30; FIG. 4B shows the current flowing through the plasma from one or more of cathodes 10, 20, 30 to anode 4 through the plasma generating gas in plasma channel 6. The values for the voltage, current, and time described below are those preferred for the method when used in connection with a three-cathode assembly in a pulsed plasma device shown in FIG. 3. When this method is used for other embodiments of the multi-cathode assembly or when a multi-cathode assembly is used in another device, other values for the voltage, current, and time may be preferable.

Figure 5A:
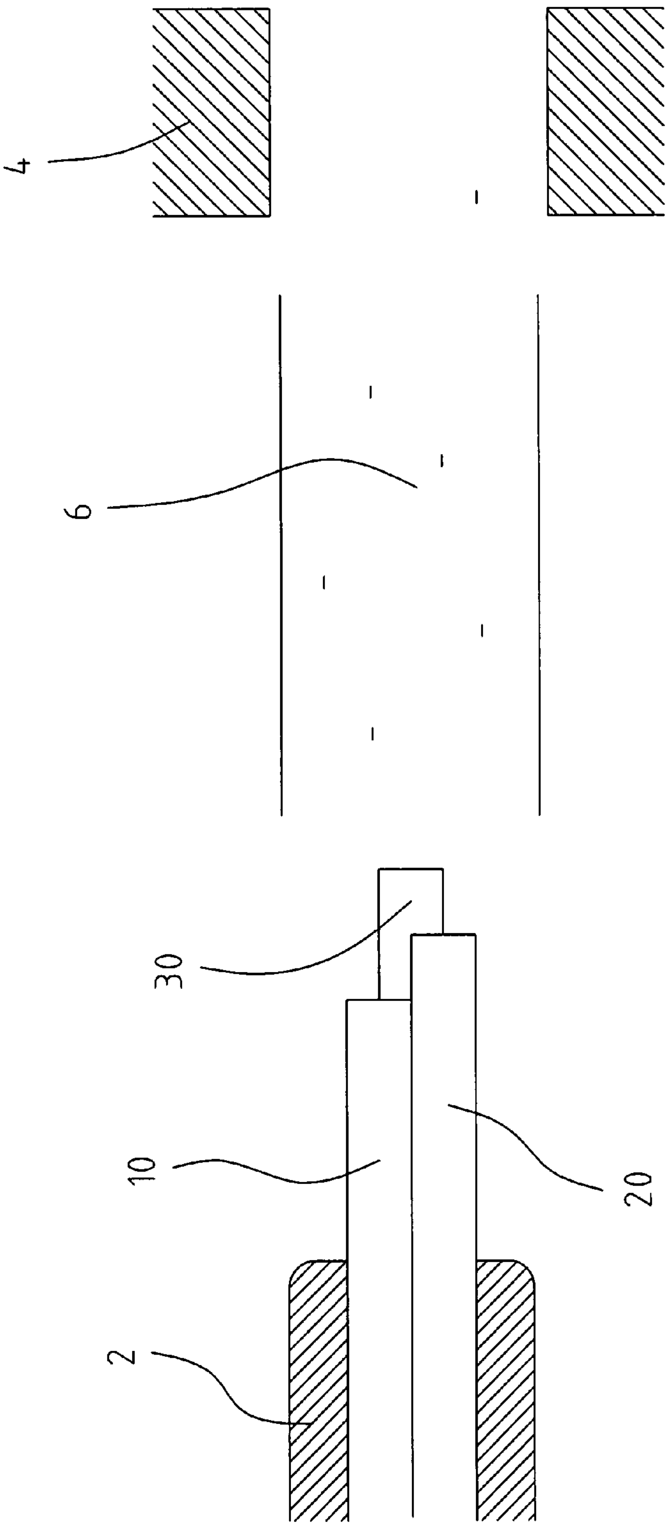
FIGS. 5A-I illustrate processes that occur in a plasma channel during the generation of a pulse.

FIG. 4A shows a graph of the voltage applied between anode 4 and cathodes 10, 20, 30. Prior to generation of a plasma pulse, at time $t_0$, a bias voltage 202 is generated. The bias voltage may be 100-1,000 Volts, but preferably is 400-500 Volts. Between $t_0$ and $t_1$, the bias voltage is applied between anode 4 and cathodes 10, 20, 30, by an electronic circuit. However, generating bias voltage 202 does not generate any current through the plasma generating gas in plasma channel 6, because the resistance of the plasma generating gas is close to infinity. In one embodiment a capacitor is used for sustaining the bias voltage. FIG. 5A shows that there is no current flowing in plasma channel 6 between $t_0$ and $t_1$ and that there are just a few free electrons in plasma channel 6 between cathodes 10, 20, 30 and anode 4.

At time $t_1$, a high frequency, high amplitude voltage wave 204, is applied between anode 4 and cathodes 10, 20, 30. The amplitude of the wave is at least 1 kV, but is preferably around 5 kV. In some embodiments the high frequency, high amplitude voltage wave 204 is damped, with exponentially decreasing amplitude, as shown in FIG. 4A. The frequency of the wave is at least 300 kHz, preferably around 500 kHz. The duration of the high voltage, high frequency wave is at least two wavelengths. For example, the duration of the wave with the frequency of 500 kHz should be at least 0.4 microseconds; however a longer wave of 15-20 microseconds is preferable. Note that the high frequency, high amplitude voltage wave 204 is the only voltage controlled part of the pulse plasma generation. During the remainder of the pulse, the voltage is simply maintained between anode 4 and cathodes 10, 20, 30 as a result of the current passing through the plasma generating gas between cathodes 10, 20, 30 and anode 4.

Figure 5B:
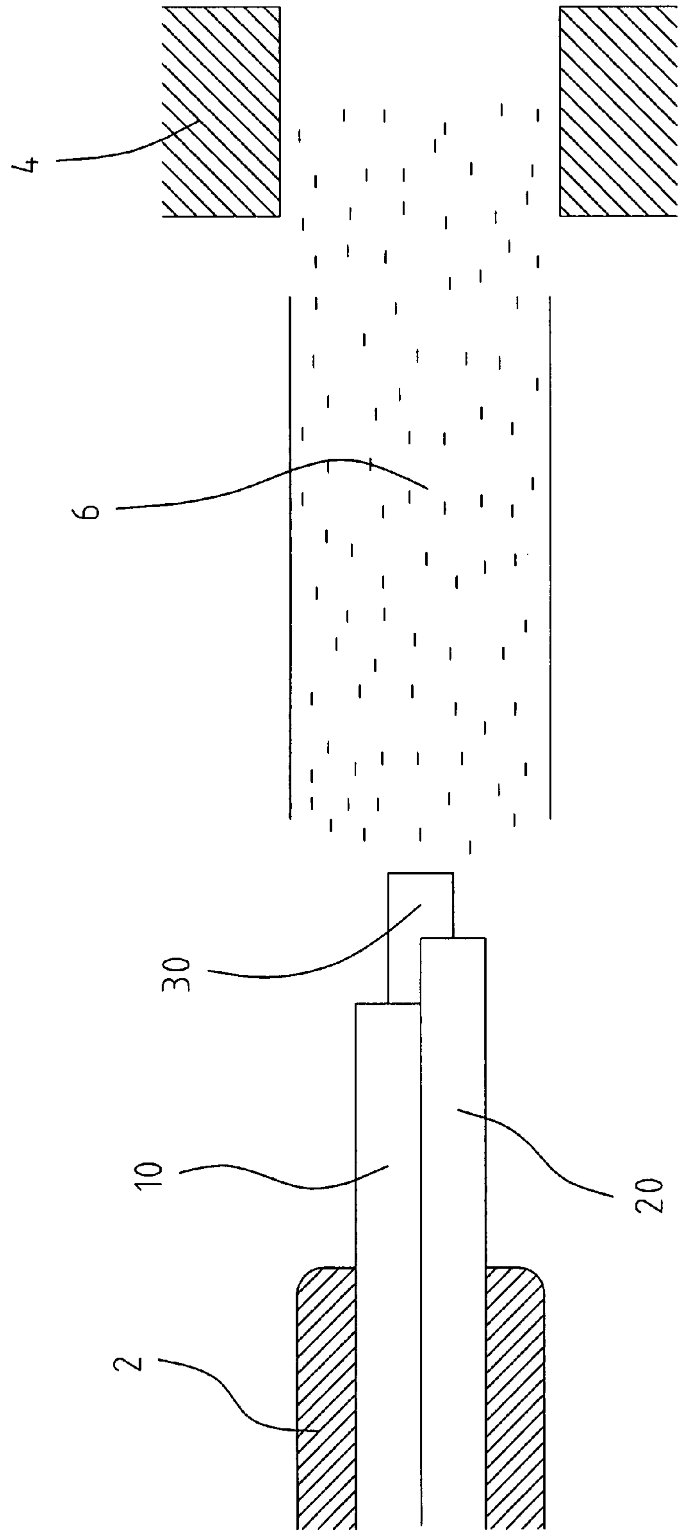

The high frequency, high amplitude voltage wave 204 creates a rapid alternating motion of the free electrons in the plasma generating gas inside plasma channel 6. The rapidly moving free electrons strike out electrons from atoms of the plasma generating gas flowing through plasma channel 6. This process is known as electron avalanche. As a result of the electron avalanche, the quantity of free electrons reaches the number sufficient for creation of a spark discharge between cathodes 10, 20, 30 and anode 4, as shown in FIG. 5B.

Figure 5C:
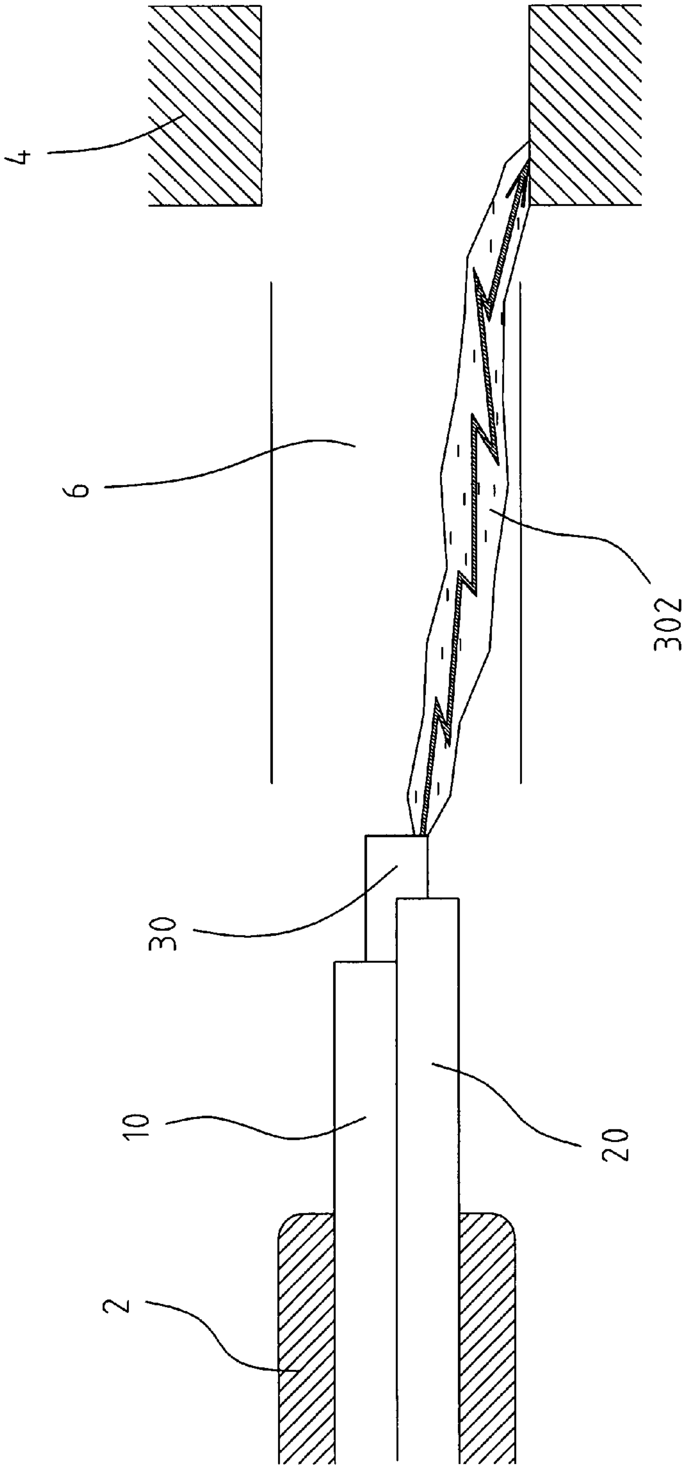

In embodiments that have plasma channel 6 formed by one or more intermediate electrodes, such as the one shown in FIG. 3, a spark would first be established between the cathodes and intermediate electrode 42*a* closest to the cathodes. Other sparks are created between the free electrons in the plasma generating gas flowing through plasma channel 6 and other intermediate electrodes 42*b-e* that form plasma channel 6. Eventually, a spark discharge between cathodes 10, 20, 30 and anode 4, shown in FIG. 5C, is created.

The spark discharge ionizes a number of atoms in the plasma generating gas, thus, increasing the conductivity of the plasma generating gas and lowering its resistance, preferably to 200-1,000Ω. The free electrons that are created as a result of ionization are confined to a relatively small volume 302 shown in FIG. 5C.

At time $t_2$, after the high frequency, high amplitude voltage wave 204 terminates, voltage 206 in the range of 100-1,000 Volts, but preferably around 400-500 Volts, is applied between anode 4 and cathodes 10, 20, 30. In some embodiments the voltage applied at time $t_2$ is equal to bias voltage 202 of the high frequency, high amplitude voltage wave 204.

In some embodiments, voltage 206 is exponentially decreasing with time, as shown in FIG. 4A.

Figure 5D:
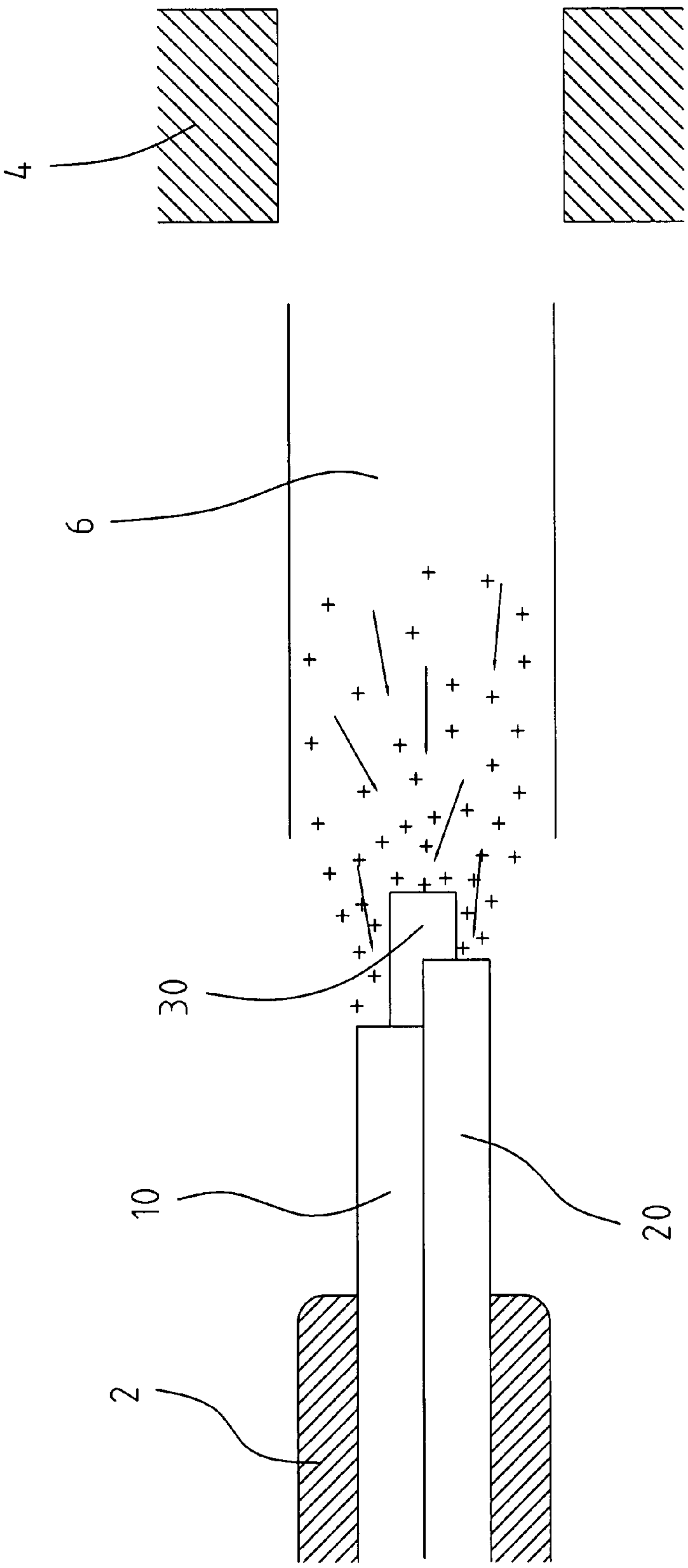

At time $t_2$, the plasma generating gas has enough free electrons to conduct electricity. However, cathodes 10, 20, 30 have not been sufficiently heated to achieve thermionic electron emission that would enable a sustainable electric arc that would maintain generation of the plasma flow with characteristics required for a particular application, such as, for example, skin treatment. The discharge voltage 206 begins the glow discharge phase. For cathodes 10, 20, 30 to begin emitting electrons thermionically, their surfaces 12, 22, and 32 have to reach a certain temperature specific to the cathode material, referred to as thermionic electron emission temperature or temperature of thermionic electron emission. For example, for a cathode made of tungsten containing lanthanum, such as the one used in the preferred embodiment, the temperature of electron emission is approximately 2,800°-3,200° K. Under the influence of the electric field created by the voltage between anode 4 and cathodes 10, 20, 30, free electrons present in plasma channel 6 are attracted toward anode 4 and ions are attracted toward cathodes 10, 20, 30. The glow discharge shown in FIG. 5D is a self-sustaining discharge with cold cathodes emitting electrons due to secondary emission, mostly due to the ionic bombardment. A distinctive feature of this discharge is a layer of positive space charge at the cathodes, with a strong electric field at the surface and considerable potential drop 100-400 Volts, in the preferred embodiment. This drop is known in the art as a cathode fall. If the current is increased, the glow discharge will at a specific level transfer into an arc discharge and will by then have reached a sufficient surface temperature to emit electrons thermionically.

At time $t_3$, when the voltage between anode 4 and cathodes 10, 20, 30 drops to a predetermined value, the current passing through cathodes 10, 20, 30, the plasma generating gas in plasma channel 6, and anode 4, increases from 0 A to a predetermined first current preferably in the range of 4-6 A. Preferably, this current is maintained for 1-10 ms. The predetermined voltage when the current begins to increase is between $e^{-0.5}$-$e^{-1.5}$ times the voltage at time $t_2$, but preferably it is approximately $e^{-1}$ times the voltage at time $t_2$. (Note that e is a base of the natural logarithm, which approximately equals to 2.718.) For example, in one embodiment, the voltage applied between anode 4 and cathodes 10, 20, 30 at time $t_2$ is approximately 400 Volts. When the voltage drops to approximately 150 Volts, the current through the plasma generating gas is increased to approximately 5 A. In some embodiments the current increase is a ramp 208 with duration of 300-500 microseconds between $t_3$ and $t_4$.

Figure 5E:
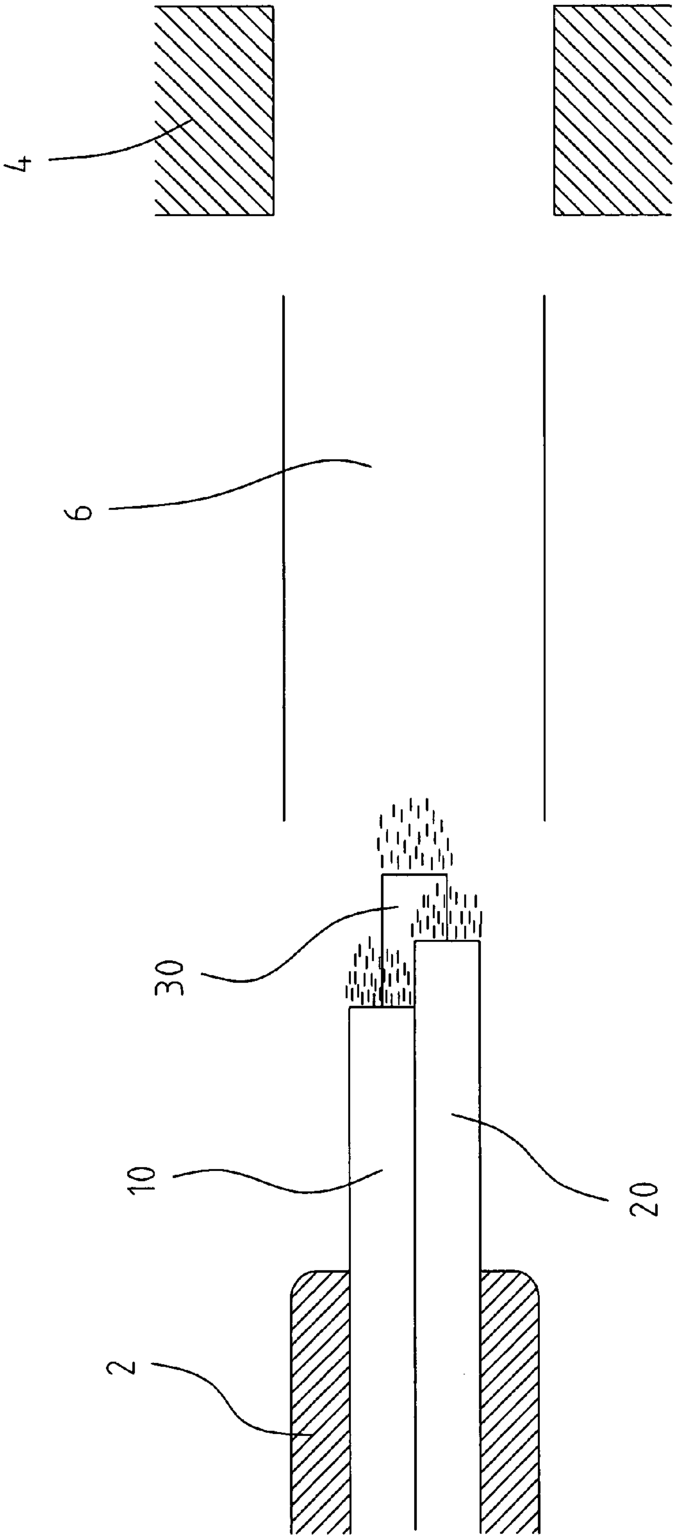
Figure 5F:
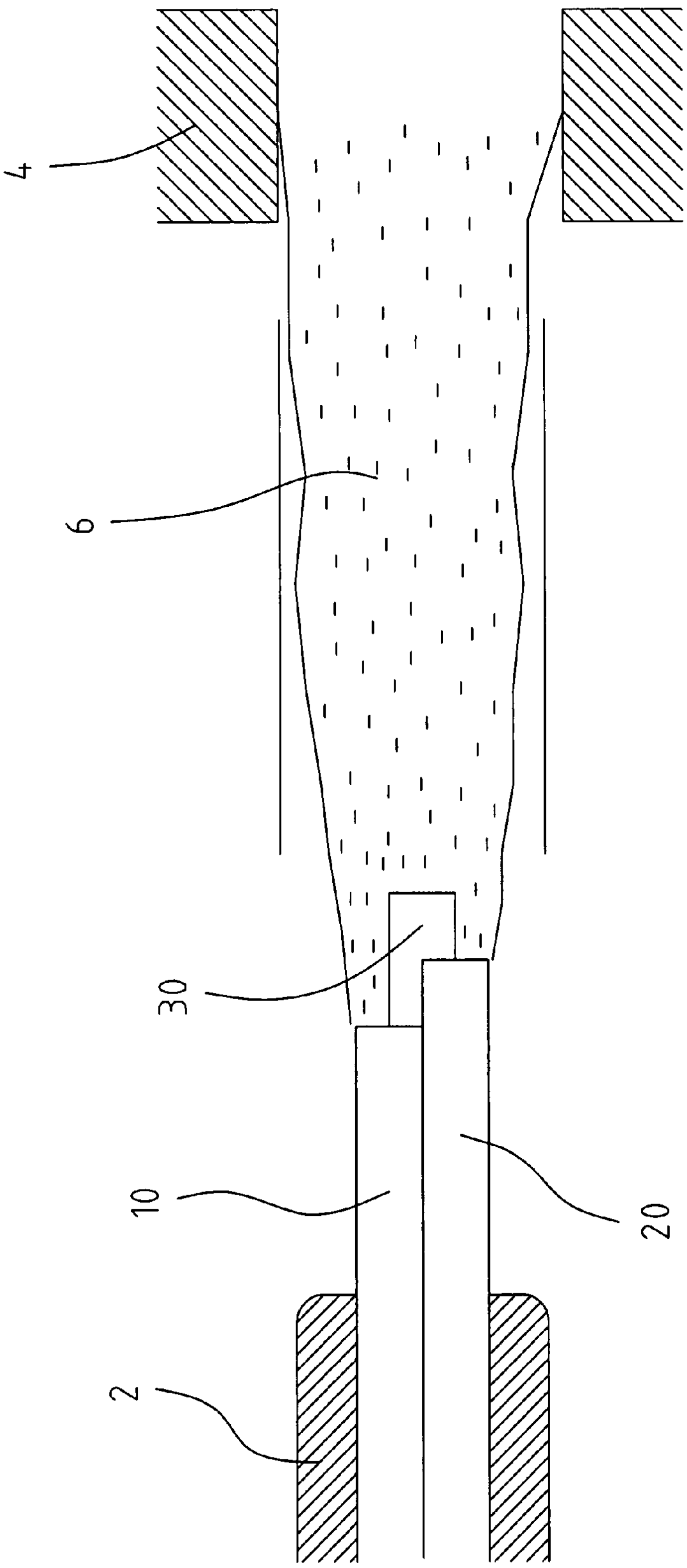

At some time after $t_4$, the cathodes begin to emit electrons thermionically from their surfaces 12, 22, and 32 as shown in FIG. 5E. The electron emission at this time is sufficient to sustain an electric arc required for generating the plasma of desired properties. At this time the arc discharge phase begins and the arc between cathodes 10, 20, 30 and anode 4 along plasma channel 6 is established. The resistance of the plasma in the flow is approximately 1-3Ω. At this time, theoretically, the current can be increased to an operational level required for a particular application as shown in FIG. 5F. However, increasing the current to the operational level at this time would lead to the following undesired effects. As shown in FIG. 5D-F, all cathodes in the assembly are involved in the glow discharge phase and then subsequently in the arc discharge phase. Bodies of cathodes 10, 20, 30 continue to be bombarded by the positively charged ions during the glow discharge phase and the arc attaches to the surface area of all cathodes during the arc discharge phase. During the off period between pulses, the temperature of cathodes 10, 20, 30 does not drop to the original non-operational level, so that the glow discharge and arc discharge phases occur when the cathodes are still heated from the previous pulse. As greater portions of the cathodes become sufficiently heated to emit electrons with each pulse, the area of plasma attachment increases. At some time, after approximately 300-500 pulses, the plasma attaches to the entire surface area of the cathodes and begins to attach to cathode holder 2 as well.

As the arc attaches to cathode holder 2, the cathode holder becomes heated to the point that it begins to sputter and emit electrons along with electrode materials. This introduces impurities in the plasma flow, which for some applications, especially medical applications, is unacceptable. Furthermore, the cathode holder, which has a melting point significantly lower than that of the cathodes, begins to melt. As the portions of the cathode holder that come in contact with one or more cathodes begin the melt, those cathodes are damaged. This damage results in an imperfection, to which the electric arc could attach during subsequent pulses. Attachment of the arc to this imperfection at the base of one or more cathodes may also result in the electric arc terminating outside of the plasma channel. This results in the inability to control whether the plasma is formed in the plasma channel. Additionally, the uncontrolled surface of attachment leads to fluctuations of electric potential on the cathodes. In general, uncontrolled expansion of the area of the arc attachment, leads to unstable operation of the device.

Extending the length of the cathodes, and thus distancing cathode holder 2 from the anode ends of cathodes 10, 20, 30, where arc attaches initially, proved to be a suboptimal solution. Experiments have shown that lengthening the cathodes does not eliminate but only insignificantly delays the undesirable processes described above.

Figure 5G:
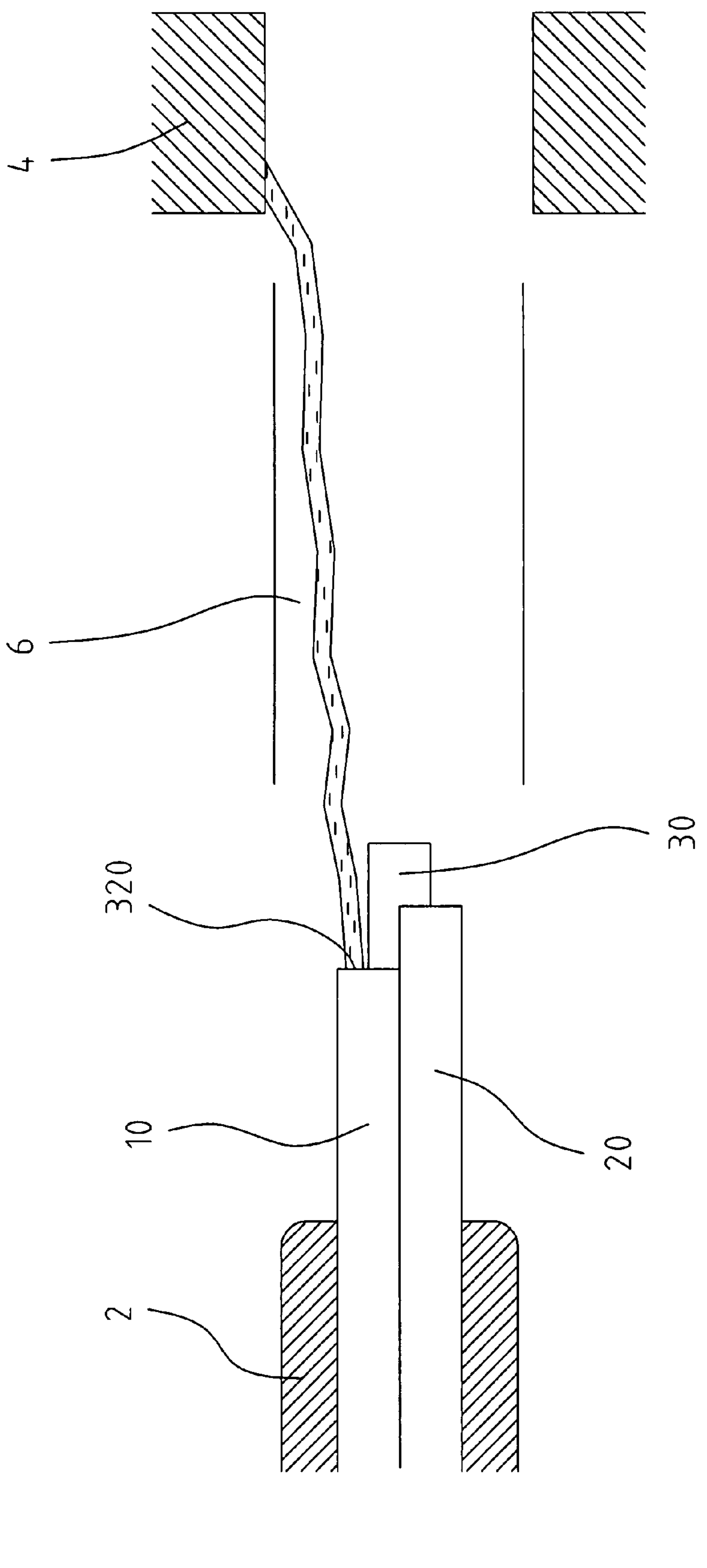

According to the preferred methods at time $t_5$ the current is decreased to the second current. In some embodiments, the current decrease is a ramp 209 with duration of 300-500 microseconds. The current is preferably decreased to a level between the minimal current required to sustain the arc discharge and approximately three times that current. For some embodiments this current is in the range of 0.33-1.0 A. Preferably the second current is maintained 5-20 ms. The current drop results in a decrease of the cross section of the electric arc between cathodes 10, 20, 30 and anode 4 as well as in a decreased area of the arc attachment. Although it is not necessary to decrease the attachment area to the minimum required for sustaining the arc, the decreased current reduces the area of attachment to the size that does not significantly exceed the minimum area. As shown in FIG. 5G, the arc does not attach to the entire surface area of the cathodes. In fact, to sustain the electric arc, the emitted electrons concentrate in a relatively small volume and are emitted from a small area, shown in FIG. 5G. The ionic current heating the cathode remains strong enough to sustain the thermionic electron emission from the cathode, because of the high current density flux through the small area of attachment. This ionic current results in a very high temperature at the area of the arc attachment and the surrounding volume. Decreasing the current applied to cathodes 10, 20, 30, plasma generating gas, and anode 4 in this manner ensures that the arc attaches only to a single cathode, and furthermore that the attachment of the arc is constrained to a relatively small area.

It has been experimentally found that the cathode diameter has the most significant effect on the minimum sustainable current that may be passed through the cathode while still maintaining an electric arc between the cathode and the anode. For example, the minimum current for the cathode with diameter of 1.0 mm and length of 5 mm is approximately 1 A. The minimum current for the cathode with diameter of 0.5 mm and length of 5 mm is approximately 0.5 A. The minimum current for the cathode with diameter of 0.5 mm and length of 35 mm is approximately 0.3 A. Because during the period of the second, decreased, current, between $t_6$ to $t_7$, the plasma attaches to only one cathode, it is possible to sustain the electric arc with a relatively small current, compared to the current required for sustaining the arc if it attached to all cathodes in the assembly, as for example between $t_4$ to $t_5$. Turning to the preferred embodiment of the cathode assembly, because the diameter of a single cathode in the assembly is approximately a half of the total diameter of all cathodes in the assembly, when the arc attaches to a single cathode, the current required to sustain the arc is approximately a half of what it would have been if the arc attached to all three cathodes.

At time $t_7$ the current is increased to the third current, the operational level required for a particular application, preferably in the range of 10-80 A. In some embodiments, the current increase is a ramp 211 with duration of 300-500 microseconds between $t_7$ and $t_8$. The rate of increase is 1,000-10,000 A/s. By time $t_8$, operational voltage, preferably in the range of 30-90 Volts remains between anode 4 and cathodes 10, 20, 30 as a result of the geometry of the device and the current passing between one of cathodes 10, 20, and anode 4.

Figure 5H:
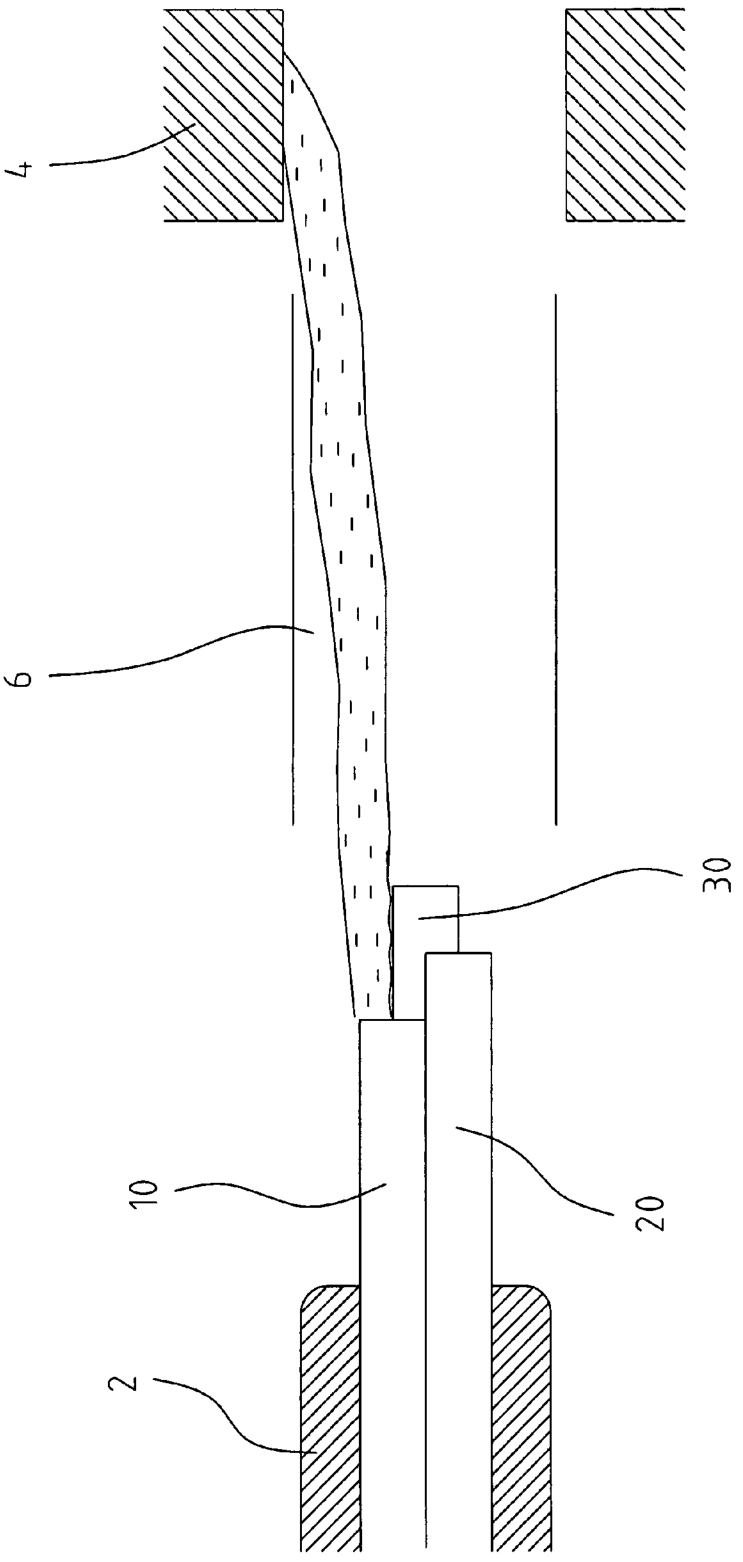
Figure 5L:
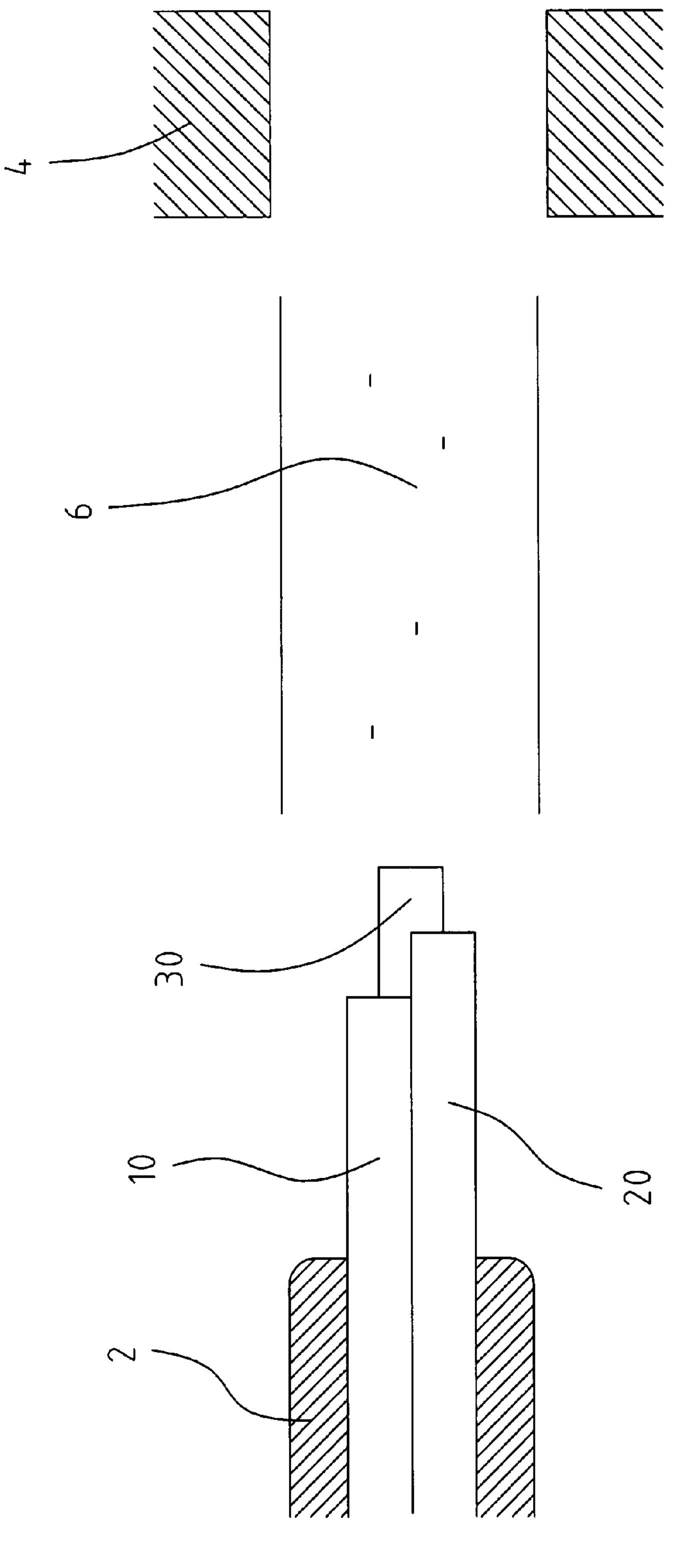

At time $t_8$, the current reaches the operational level, and the fully developed plasma flow is maintained at the operational current level 214 and the operational voltage level 216, which are preferably 10-80 A and 30-90 Volts, respectively. These operational levels are maintained for the desired duration for a particular application. For example, for skin treatment, the preferred duration $t_7$-$t_8$ is 5-100 ms. FIG. 5H shows an electric arc between one of the cathodes, cathode 10, and anode 4 that sustains a fully developed plasma flow. During the operational period of the pulse, The electric arc has a cross-section that is not significantly larger than the cross-section of the arc during period $t_6$-$t_7$, when the second current is passed.

At time $t_9$, when the plasma flow has been sustained for the desired duration, the current flowing through the plasma generating gas in plasma channel 6 is turned off and consequently the voltage between anode 4 and cathodes 10, 20, 30 ceases to be applied, and the device enters the off period, shown in FIG. 5I, until the next pulse of plasma is generated.

Figure 6A:
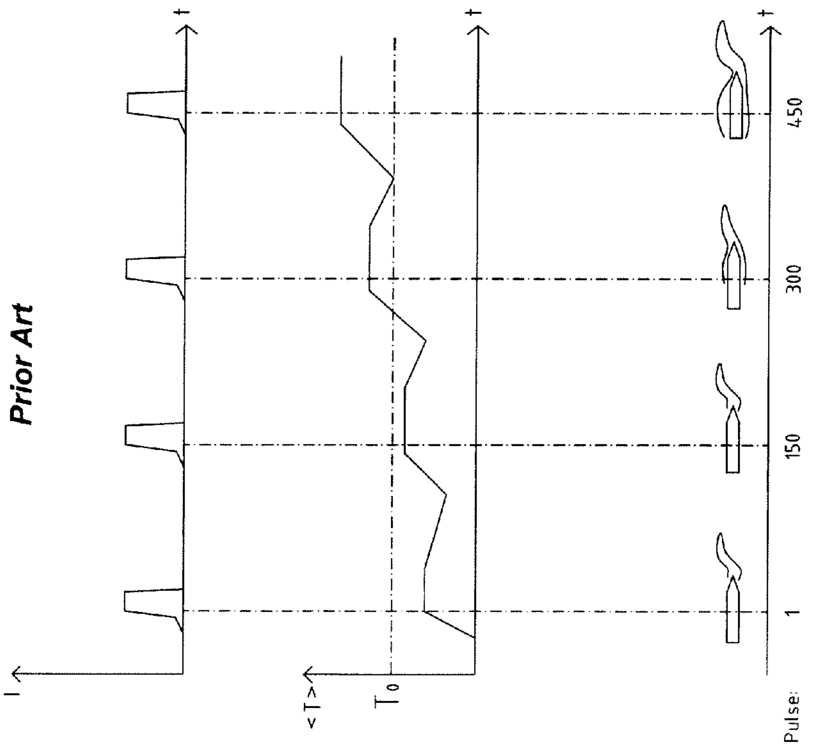
FIG. 6A illustrates the temperature of a cathode in a single cathode assembly and the area of arc attachment after a number of pulses generated according to the methods presently known in the prior art.

Using the method described above avoids a gradually expanding area of arc attachment as described above. The glow discharge that takes place from $t_2$ to $t_4$, when plasma may attach to the entire exposed surface area of the cathodes lasts up to 10 ms in the preferred embodiment. Any temperature increase that is gained during the glow discharge is lost during the remainder of the pulse and the off period. As a consequence, by the time the new pulse has to be generated, the cathodes have cooled down. FIG. 6A schematically illustrates the temperature and the area of attachment for a single-cathode assembly for a sequence of pulses generated according to the prior art methods. The upper graph shows the current as a function of time. The middle graph shows the temperature of the cathode as a function of time. The bottom graph shows the area of arc attachment to the cathode assembly as a function of time. Although FIG. 6A shows only four pulses for the purposes of illustration, the actual processes may occur over the span of about 300-500 pulses. So, for example, the first illustrated pulse may be the first actual pulse, the second illustrated pulse may be the 150th actual pulse, the third illustrated pulse may be the 300th actual pulse, and the fourth illustrated pulse may be the 450th actual pulse. During the first illustrated pulse, the cathode is cold, and the arc attaches to a small area of the cathode surface. However, the current passing through the cathode during the first illustrated pulse increases the temperature of the cathode. Although the temperature of the cathode decreases somewhat before the next pulse, it does not decrease to its original non-operational temperature. During the second illustrated pulse, the area of arc attachment does not increase, however, the temperature of the cathode increases even further. After the second illustrated pulse, the temperature decreases somewhat, but does not reach even the temperature of the cathode before the second pulse. During the third illustrated pulse, the temperature further increases and exceeds critical temperature $T_0$, above which the entire body of the cathode is able to thermionically emit electrons. After the temperature of the cathode exceeds $T_0$, the area of attachment increases rapidly with each next pulse. As shown in FIG. 6A, by the fourth illustrated pulse, the area of arc attachment covers the entire cathode surface.

Figure 6B:
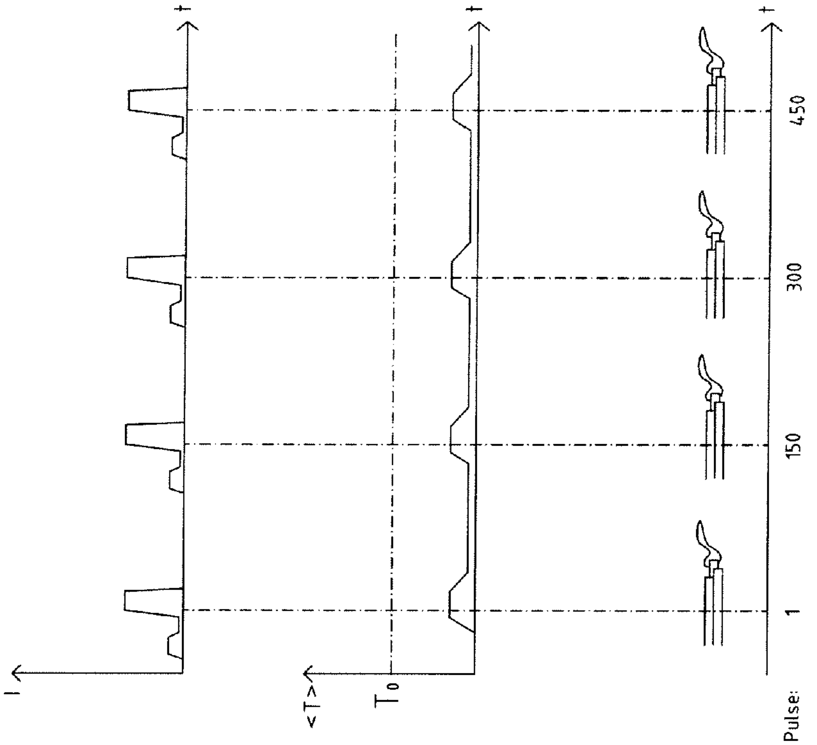
FIG. 6B illustrates the temperature of cathodes in a multi-cathode assembly and the area of arc attachment after a number of pulses generated according to the embodiments of the present invention.

FIG. 6B schematically illustrates the temperature and the area of attachment of the preferred embodiment of the multi-cathode assembly for a sequence of pulses generated according to embodiments of this invention. The current pulses correspond to the ones shown in FIG. 4B and described above. The illustrated pulses correspond to the actual pulses in the same manner as in FIG. 6A. As described above, in each pulse of current, after the arc is started it attaches to all cathodes in the assembly. The current then decreases to reduce the area of attachment to only a single cathode, and only then is the current increased to the operational level. Because for substantially the entire duration of the pulse, the arc attaches to a small area, the entire body of the cathode is not significantly heated. During the off period, the cathodes cool rapidly because a large portion of the cathode assembly was relatively cold during the pulse. As shown in FIG. 6B, after the first illustrated pulse, the temperature of the cathode drops to a non-operational temperature before the next actual pulse. Therefore, when the next actual current pulse begins, the cathodes in the assembly have the original non-operational temperature. During the off period following that pulse, the temperature of the cathodes again drops to original non-operational level. Because the temperature of the cathodes never exceeds $T_0$, the area of attachment does not increase and remains approximately the same for tens of thousands pulses as shown in the bottom graph of FIG. 6B.

Figure 7A:
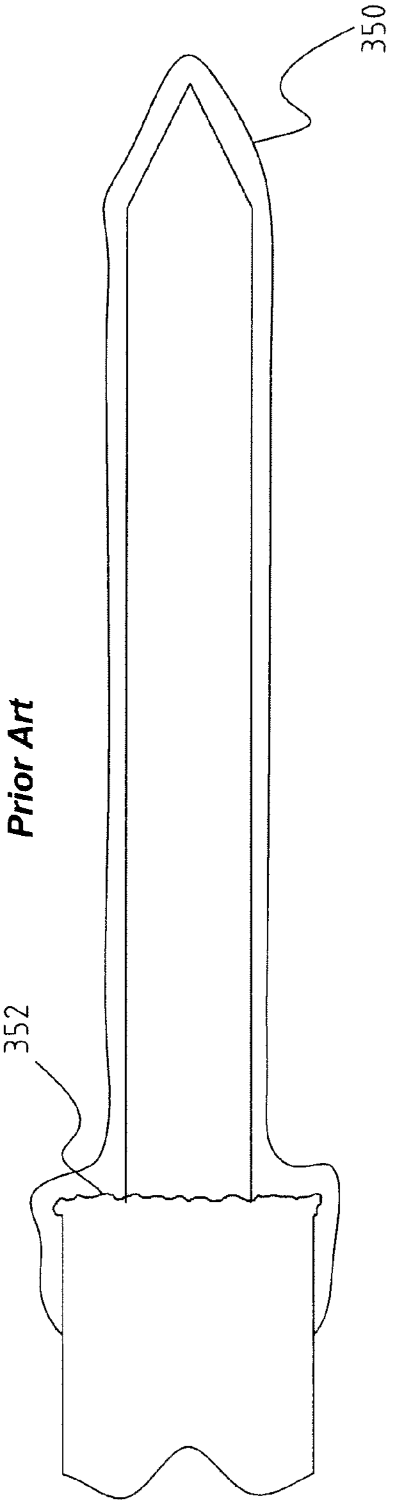
FIG. 7A is a sketch of a microscopic view of a single-cathode assembly after 500 pulses generated according to the prior art methods.
Figure 7B:
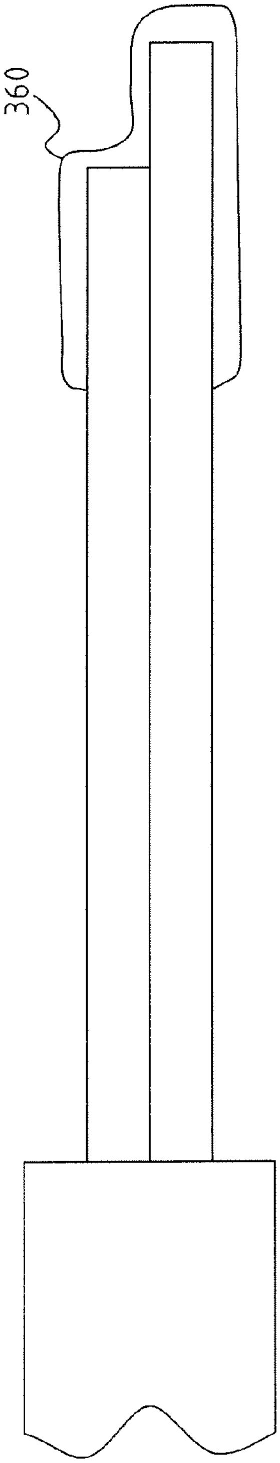
FIG. 7B is a sketch of a microscopic view of a multi-cathode assembly after 40,000 pulses generated according to embodiments of the method of the present invention.

FIG. 7A is a sketch of a microscopic view of a single-cathode assembly after 500 pulses generated according to the prior art methods. Area 350 is the area of attachment of the electric arc during the last pulse of the 500-pulse session. Cathode holder 352 has melted and area 350 includes the entire cathode. Microscopic examination of the cathode showed that the area of attachment is heavily eroded, which is due to the temperature instability of the cathode that results from the method of operation without regard for controlling the area of attachment. FIG. 7B is a sketch of a microscopic view of a multi-cathode assembly after 40,000 pulses generated according to embodiments of the method of the present invention. Area 360 is the area of attachment during the last pulse of the 40,000-pulse session. As seen from FIG. 7B, the cathode holder and the longitudinal portion of the cathodes closest to the holder are unaffected because the arc never attaches to them. Also, the portions of the cathodes that are covered by the area of attachment are affected insignificantly by the arc because the arc attaches to that area only between $t_4$ and $t_5$, as shown in FIG. 5F, and after $t_5$, the area of attachment is reduced to a small area on one of the cathodes, so that the remainder of the cathodes is not affected by the arc.

It has been experimentally discovered that for the cathode assembly shown in FIG. 2 during the first few thousand pulses, the arc attaches to the shortest cathode 10. During these pulses, the anode end of cathode 10 undergoes significant heating. As a result, some melting occurs at the anode end of cathode 10. Cathode 10 loses the well defined surface imperfection of edge 14. Once the surface imperfection is not so well defined, the arc begins to attach to the second shortest cathode 20, the anode end of which still has a well defined edge 24. After a few thousand pulses, the end of cathode 20 loses the well defined edge 24. Then, the arc begins to attach to the next shortest cathode, cathode 30. After a few thousand pulses, the end of cathode 30 loses its well defined edge 34 as well. In the embodiments of the cathode assembly comprising more than three cathodes, the arc attaches to different cathodes in the order of increasing length. After the arc has been attaching to the longest cathode, and because of the heat absorbed by its anode end, ends of all of the cathodes closest to the anode lose their well defined edges due to some melting.

Once this happens, the arc begins to attach to the shortest cathode again. The arc attaches to cathode 10 for a few thousands of pulses, until the anode further loses the definition of its edge 14. At this point, the arc begins to attach to the second shortest cathode, cathode 20, that has the anode end with a better defined edge 22 than edge 12 In a few thousand pulses, the arc attaches to the next shortest cathode, etc.

For the cathode assembly shown in FIG. 2, experiments have shown that the arc attaches to cathode 10 for approximately 10,000 pulses, then it attaches to cathode 20 for the next approximately 10,000 pulses, and then to cathode 30 for the next approximately 10,000 pulses. After that the arc attaches to cathode 10 for the next approximately 10,000 pulses again, etc. The cathode assembly shown in FIG. 2 was shown to work in this manner for sessions of 60,000 pulses, which is sufficient for most pulsed plasma applications.

Although the method disclosed above provides the best results when used with a multi-cathode assembly, using the method can also be beneficial for a single cathode assembly.

The foregoing description of the embodiments of the present invention has been presented for purposes of illustration and description. It is not intended to be exhaustive nor to limit the invention to the precise form disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

What is claimed:

1. A cathode assembly comprising:

a. a cathode holder; and b. a plurality of longitudinally aligned cathodes which are connected as a cluster to the cathode holder, with each cathode being in direct physical contact with at least one other cathode.

2. The cathode assembly of claim 1, wherein the cathodes are electrically connected to each other.

3. The cathode assembly of claim 1, wherein at least one of the cathodes has a length that differs from the length of at least one other cathode.

4. The cathode assembly of claim 3, wherein all of the cathodes have different lengths.

5. The cathode assembly of claim 4, wherein the diameter of each of the plurality of cathodes is substantially identical.

6. The cathode assembly of claim 5, wherein the smallest difference in length between a pair of cathodes equals the diameter of a cathode.

7. The cathode assembly of claim 5, wherein the diameter of the cathode is 0.5 mm.

8. A method of generating a pulse of plasma in a device comprising an anode and a cathode assembly having a plurality of cathodes, the method comprising:

a. establishing an electric arc at a first current level between the plurality of cathodes and the anode;

b. subsequently, maintaining the electric arc at a second current level between a first cathode of the plurality of cathodes and the anode, the second current level being less than the first current level;

c. subsequently, maintaining the electric arc at a third current level between the first cathode of the plurality of cathodes and the anode, the third current level being greater than the first current level; and d. subsequently, extinguishing the electric arc.

9. The method of claim 8 further comprising applying an alternating voltage between the anode and the plurality of cathodes prior to establishing the electric arc.

10. The method of claim 9, wherein the second current level is between one and three times the minimum current required to sustain the electric arc between one of the plurality of the cathodes and the anode.

11. The method of claim 10, wherein the second current level is 0.33-1.0 A.

12. The method of claim 11, wherein the first current level is 4.0-6.0 A.

13. The method of claim 12, wherein the third current level is 10-80 A.

14. The method of claim 8, wherein steps (a) through (d) are repeated.

15. The method of claim 14, wherein an area of attachment of the electric arc to the first cathode of the plurality of cathodes is substantially the same for multiple repetitions.

16. The method of claim 14, wherein the number of repetitions is at least 500.

17. The method of claim 16, wherein the number of repetitions is more than 1,000.

18. The method of claim 14, wherein after a number of repetitions, the method further comprises:

e. establishing an electric arc at the first current level between the plurality of cathodes and the anode;

f. subsequently, maintaining the electric art at the second current level between a second cathode of the plurality of cathodes and the anode;

g. subsequently, maintaining the electric art at the third current level between the second cathode of the plurality of cathodes and the anode; and h. subsequently, extinguishing the electric arc.

* * * * *